United States Patent
Honas et al.

(10) Patent No.: US 8,025,312 B1
(45) Date of Patent: Sep. 27, 2011

(54) AGRICULTURAL HEADER TRANSPORT KIT

(75) Inventors: Robert Honas, Newton, KS (US); Christopher T. Sauerwein, Newton, KS (US); Randy Lohrentz, Buhler, KS (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 12/817,890

(22) Filed: Jun. 17, 2010

(51) Int. Cl.
*B60R 9/06* (2006.01)
(52) U.S. Cl. .............. 280/769; 280/9; 56/228
(58) Field of Classification Search .......... 280/769, 280/79.11, 47.131, 7.12, 9, 8, 10, 277, 5.52, 280/5.524; 172/311, 677; 56/228, 15.2, 56/181
See application file for complete search history.

(56) References Cited

U.S. PATENT DOCUMENTS

| | | | | |
|---|---|---|---|---|
| 2,833,105 A * | 5/1958 | Naery | | 56/228 |
| 3,279,158 A * | 10/1966 | Kirkpatrick et al. | | 56/228 |
| 3,457,709 A * | 7/1969 | Reimer et al. | | 56/11.9 |
| 3,608,753 A * | 9/1971 | Scott | | 414/345 |
| 3,683,605 A * | 8/1972 | Jakobi | | 56/228 |
| 4,384,445 A * | 5/1983 | McIlwain | | 56/228 |
| 4,721,168 A * | 1/1988 | Kinzenbaw | | 172/311 |
| 4,770,577 A * | 9/1988 | Farris | | 410/2 |
| 5,243,810 A * | 9/1993 | Fox et al. | | 56/228 |
| 5,361,569 A * | 11/1994 | Schupman et al. | | 56/228 |
| 5,374,082 A * | 12/1994 | Smith | | 280/789 |
| 5,660,237 A * | 8/1997 | Boyko et al. | | 172/311 |
| 5,970,695 A * | 10/1999 | Dunn | | 56/228 |
| 6,209,297 B1 * | 4/2001 | Yeomans et al. | | 56/228 |
| 7,197,864 B2 * | 4/2007 | Josset et al. | | 56/228 |
| 7,197,865 B1 * | 4/2007 | Enns et al. | | 56/228 |
| 7,347,277 B2 * | 3/2008 | Enns et al. | | 172/311 |
| 2008/0271426 A1 | 11/2008 | Lohrentz | | |

* cited by examiner

*Primary Examiner* — Árpád Fábián-Kovács

(57) ABSTRACT

An agricultural header assembly broadly includes a header and a header transport assembly. The header is disposed in a transport orientation when a rigid beam thereof is out of vertical alignment with the header center of gravity. The transport assembly includes first and second pairs of spaced apart wheels shiftably connected to the rigid beam for movement between a transport position and a field position. The first and second pairs of wheels define respective first and second midpoints therebetween when in the transport position. The first and second midpoints are each disposed in general vertical alignment with the header center of gravity when the header is in the transport orientation to substantially balance the header on the transport assembly.

27 Claims, 22 Drawing Sheets

AGRICULTURAL HEADER TRANSPORT KIT

BACKGROUND OF THE INVENTION

1. Field of the Invention

The present invention relates generally to a header transport assembly. More specifically, the present invention concerns a header transport assembly that is connectable to a rigid beam of a header frame to substantially balance the header thereon when the rigid beam is out of vertical alignment with the header center of gravity.

2. Discussion of the Prior Art

Those of ordinary skill in the art will appreciate that an agricultural implement or machine, such as a self-propelled combine, typically includes an agricultural header to be carried across a field by the implement. The header is often configured to cut crop material and to convey the cut crop material for further processing by the implement. Sometimes, the header may be specially designed for use with a particular type of crop (such as a row crop harvester or a sickle header with a flexible cutterbar). Thus, it can be desirable to move the header from one field to another without the header being carried by the implement for active operation.

For such transport between fields (with such transport often being performed at a relatively low speed and over a relatively short distance), a header transport kit may be connected to the header to provide mobile support therefor when the header is in a transport orientation. Such a transport kit may be shiftable between field and transport positions, such that the transport kit need not be physically removed from the header in order for the header to be used for normal field operations. As is generally known in the art, such a transport kit should at least substantially balance the header thereon, so that the header can be safely transported between fields.

Moreover, it may be advantageous for a header transport kit to be configured such that an operator in the field can simply lower the header onto the transport kit for transport with a minimum of effort. Thus, it is desirable to place the header in a transport orientation directly from the implement, without requiring any additional support structure or equipment, such that the transport kit may be relatively self-contained. This generally means that the header must be positionable in the transport orientation within the somewhat limited range of angular movement of the feederhouse of the implement.

Header transport kits are often wheeled devices, and conventional header transport kits have included at least one wheel supporting element that is connected to and supported by rigid structure of either the cutterbar or a skid pad (with such rigid structure generally extending in the fore-and-aft direction). In this way, an axle assembly of a traditional header transport kit can be rather easily disposed in general vertical alignment with the header center of gravity in order to facilitate balanced transport.

Those of ordinary skill in the art will appreciate that, for some cutting operations, the cutterbar of the header must be positioned very close to the ground, occasionally with the header including a portion thereof that is engaged in sliding contact with the ground. Advanced flexible headers can be used to follow the natural contours of a field while severing the crop in such a close-cut manner. Such flexible headers, however, suffer from some drawbacks in that rigid framework structure, to which a header transport kit may be connected, is often limited. The rigid structure that is available may not be in vertical alignment with the header center of gravity, as it is noted that rigid structure generally extending in the fore-and-aft direction may not be present at all. Therefore, traditional header transport kits have been ineffective at substantially balancing an advanced flexible header on the transport assembly.

SUMMARY

According to an aspect of the present invention, a header transport assembly is provided that is connectable to a laterally extending rigid beam of a header frame to substantially balance and provide mobile support for the header. More particularly, an embodiment of the header transport assembly of the present invention can effectively balance and support a header with a continuous rigid beam disposed along a lower margin thereof and disposed rearwardly of laterally extending crop-cutting and crop-conveying assemblies, when the rigid beam is out of vertical alignment with the header center of gravity. Even more particularly, an embodiment of the header transport assembly of the present invention can effectively balance and support a flexible header that is devoid of any rigid structure disposed along a lower margin thereof to generally extend in the fore-and-aft direction.

According to one aspect of the present invention, an agricultural header assembly is provided to be carried across a field by an implement in a normal operational direction, where the header assembly is removable from the implement for transport. The header assembly broadly includes a header operable to cut and convey crop as the header assembly is moved across the field, and a transport assembly operable to support the header in a transport orientation when the header assembly is removed from the implement. The header includes a header frame with a rigid beam extending laterally relative to the normal operational direction, a crop-cutting assembly mounted to the header frame and extending laterally along the frame, and a crop-conveying assembly supported on the header frame rearwardly of the crop-cutting assembly and configured to convey crop severed by the crop-cutting assembly. The header is disposed in the transport orientation when the rigid beam is out of vertical alignment with the header center of gravity. The transport assembly includes a first pair of spaced apart wheels that are shiftably connected to the rigid beam for movement between a transport position and a field position. The first pair of wheels define a first midpoint therebetween when in the transport position. The first midpoint is disposed in general vertical alignment with the header center of gravity when the header is in the transport orientation to substantially balance the header on the transport assembly, with one of the first wheels being closer to the rigid beam than the other of the first wheels.

According to another aspect of the present invention, a header transport assembly is operable to provide mobile support to an agricultural header when the header is in a transport orientation, where the header includes a header frame with a rigid beam extending laterally thereacross, with the header being in the transport orientation when the rigid beam is out of vertical alignment with the header center of gravity. The header transport assembly includes a first pair of spaced apart wheels that are shiftably connectable to the rigid beam for movement between a transport position and a field position, with the first pair of wheels defining a first midpoint therebetween when in the transport position. The header transport assembly further includes a second pair of spaced apart wheels that are shiftably connectable to the rigid beam for movement between the transport and field positions, with the second pair of wheels defining a second midpoint therebetween when in the transport position. The first and second midpoints are each configured to be disposed in general vertical alignment with the header center of gravity when the header is in the transport orientation to substantially balance the header on the transport assembly when connected thereto, with one of the first wheels being closer to the rigid beam than the other of the first wheels and one of the second wheels being closer to the rigid beam that the other of the second wheels.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 8:
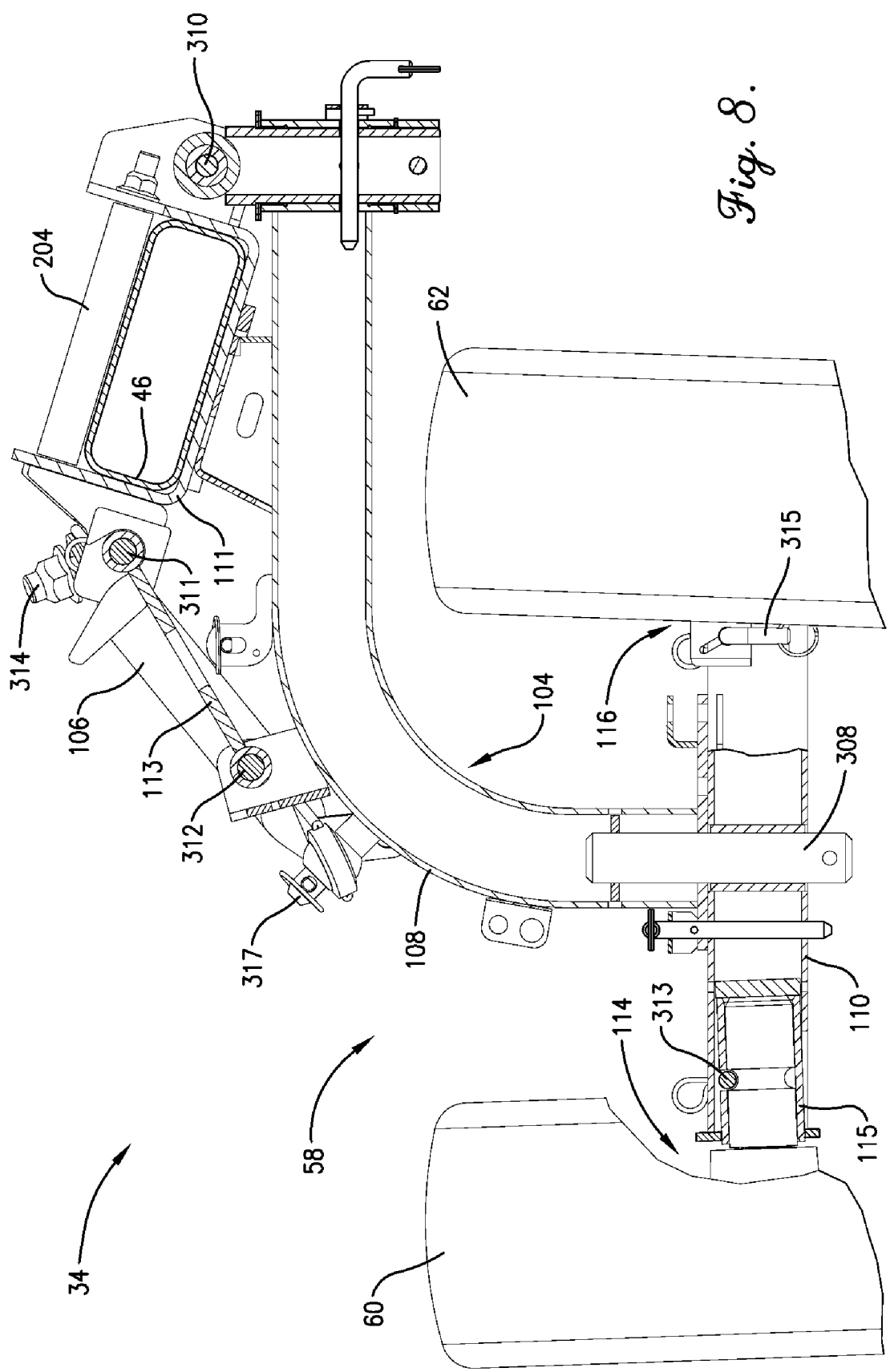
FIG. 8 is an enlarged, fragmentary, side sectional view of the agricultural header assembly shown in FIGS. 1-3, the view taken along the line 8-8 of FIG. 4, particularly illustrating details of internal structure of the portion of the header transport assembly including the front wheel supporting assembly disposed in the transport position.
Figure 14:
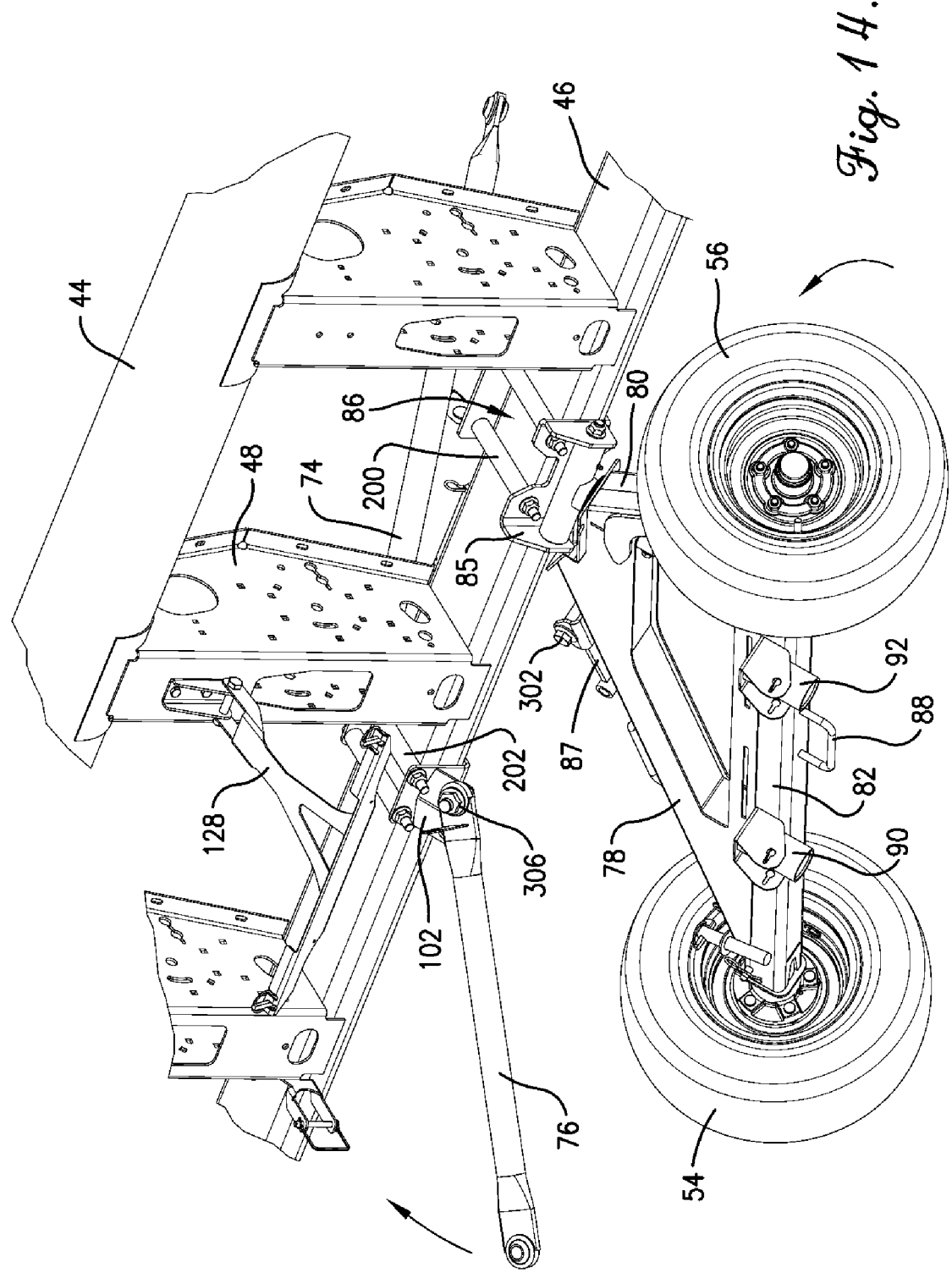
FIG. 14 is a fragmentary, isometric view of the portion of the header transport assembly shown in FIG. 13, but depicted with components of the portion of the header transport assembly including the rear wheel supporting assembly being moved further from the transport position to the field position.
Figure 16:
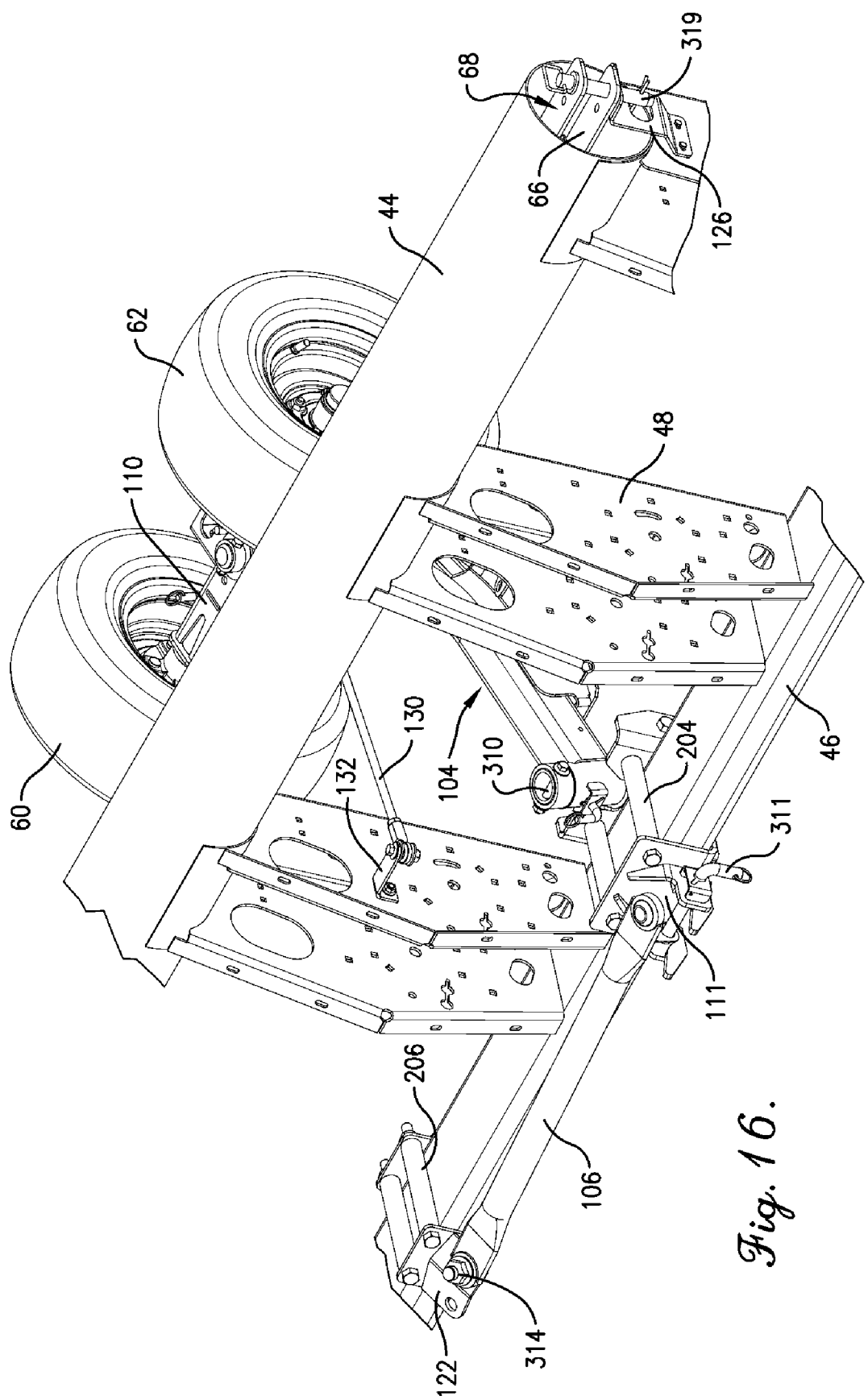
FIG. 16 is a fragmentary, left front isometric view of a portion of the header transport assembly, similar to the portion shown in FIG. 15, particularly depicting components of the portion of the header transport assembly including the front wheel supporting assembly disposed in the field position and in a stored condition for field operations.
Figure 17:
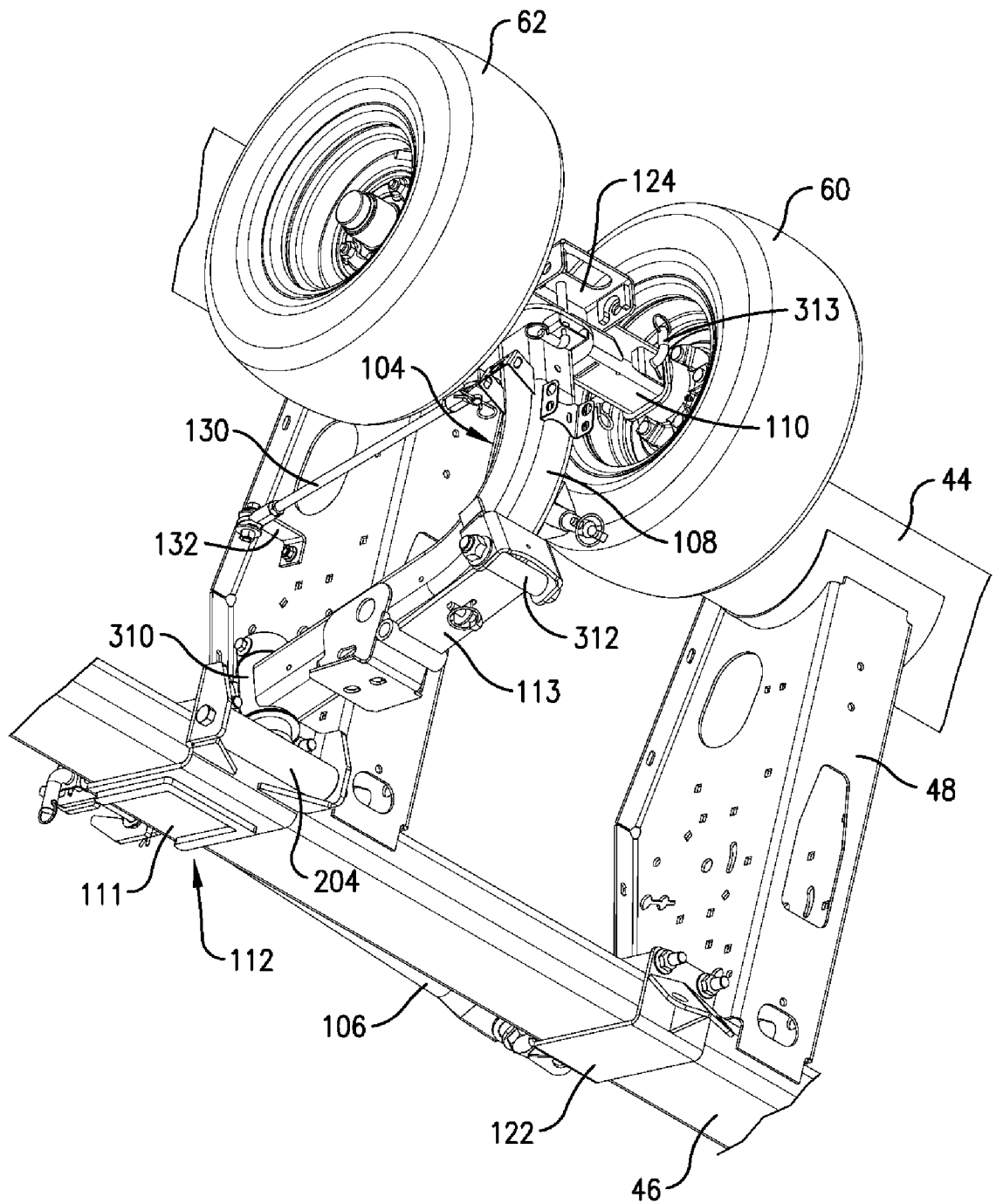
FIG. 17 is a fragmentary, left rear isometric view of the portion of the header transport assembly shown in FIG. 16, particularly depicting components of the portion of the header transport assembly including the front wheel supporting assembly disposed in the field position and in a stored condition for field operations.
Figure 18:
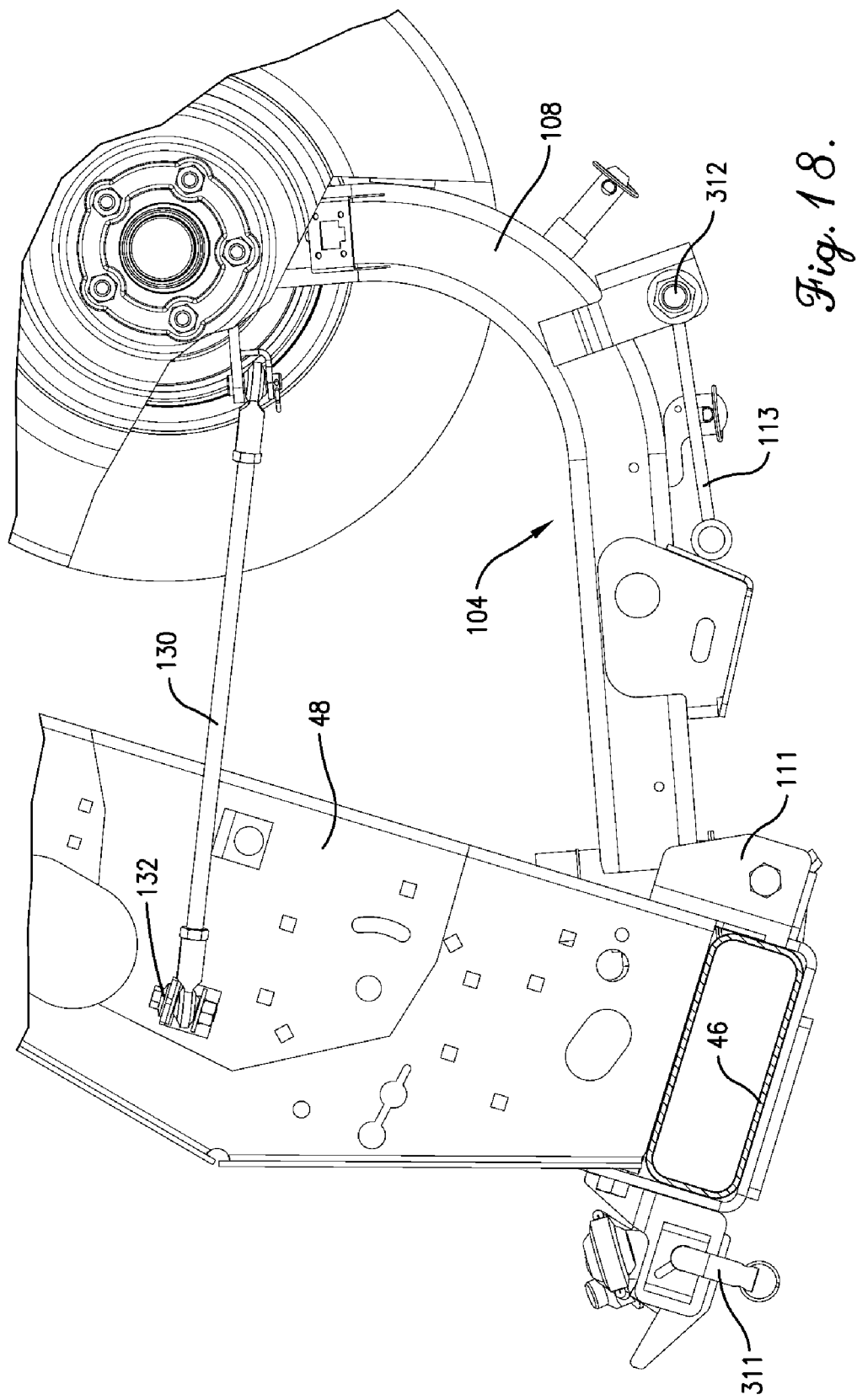
Figure 19:
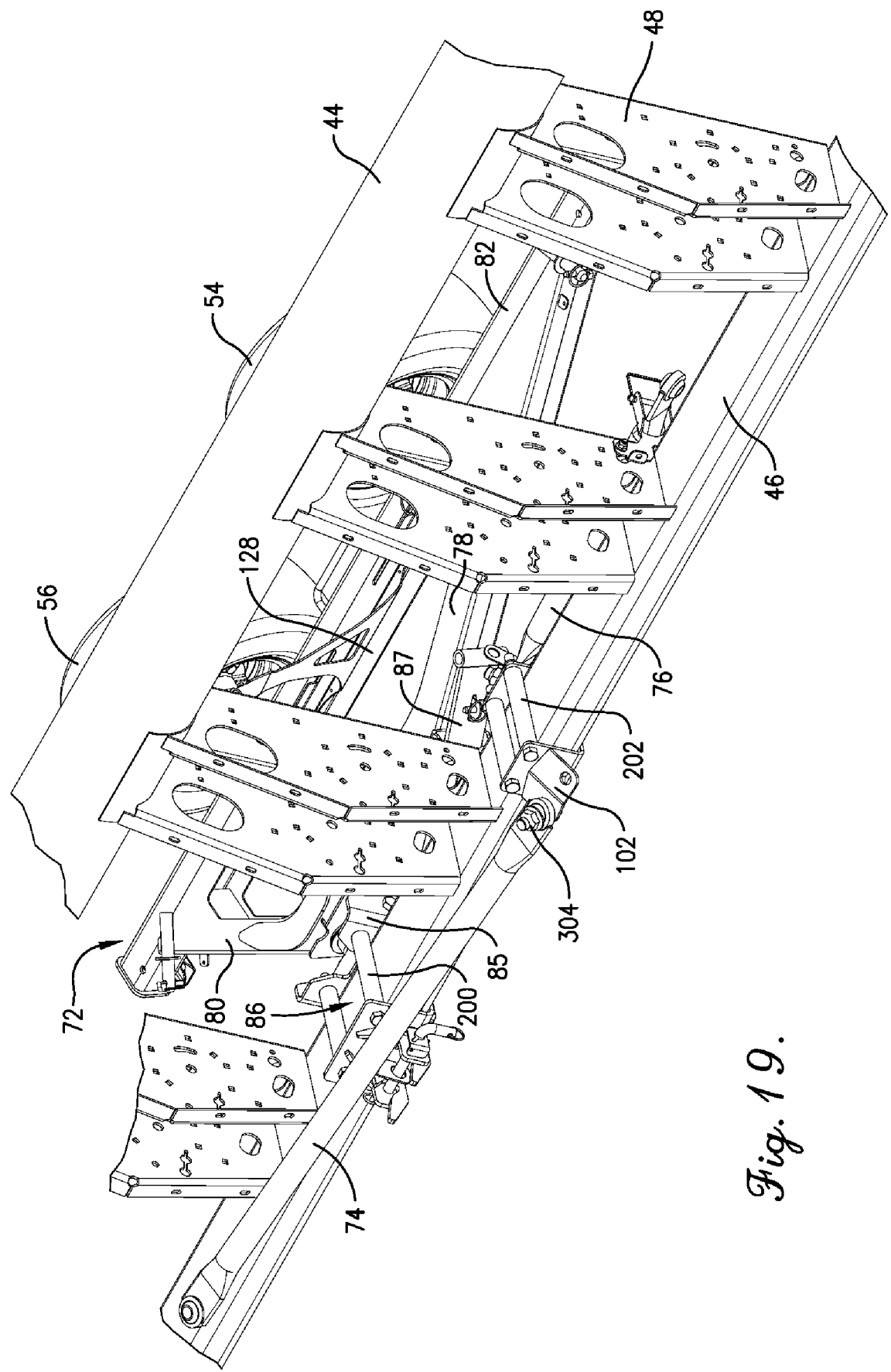
Figure 20:
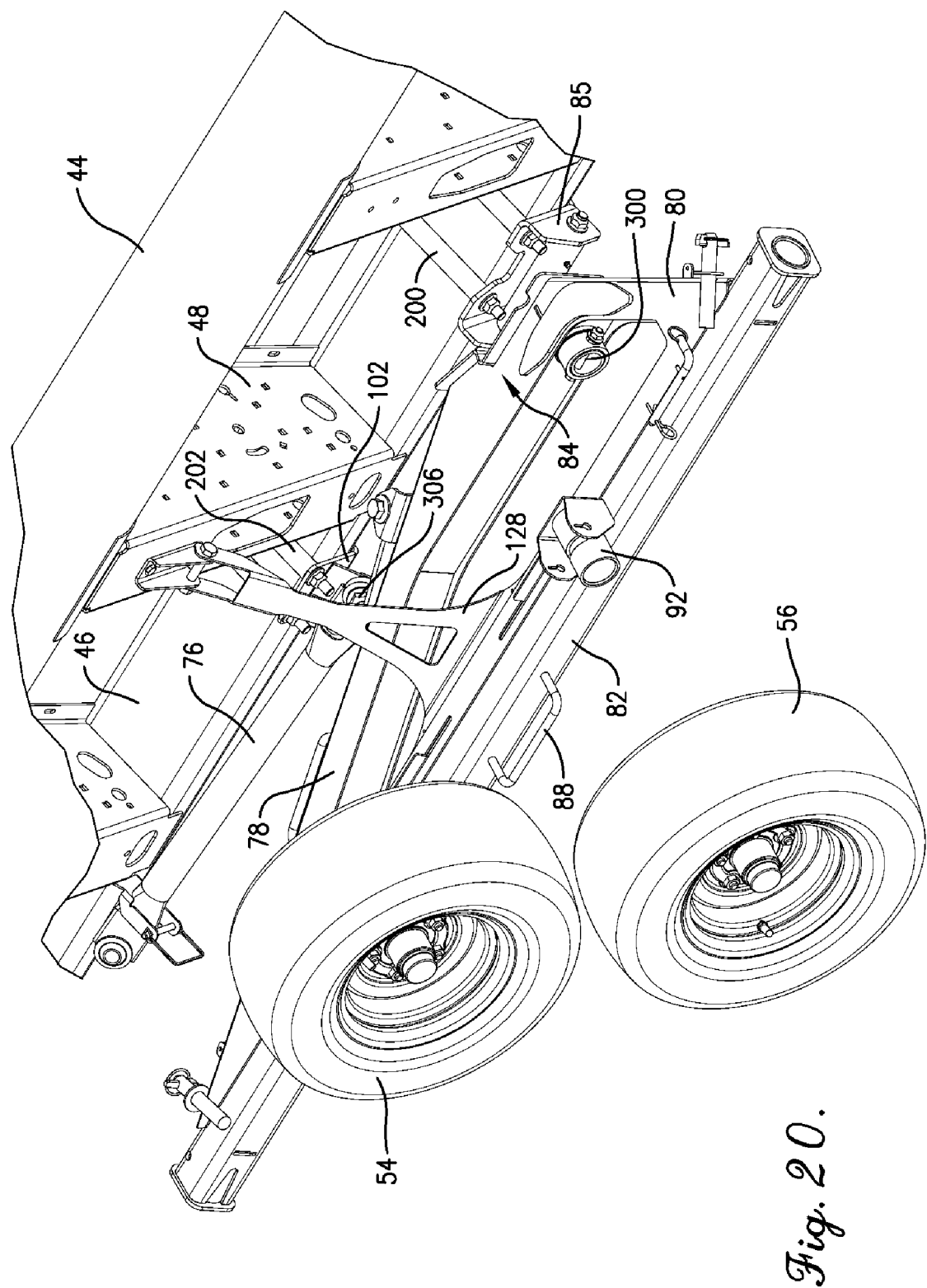
Figure 21:
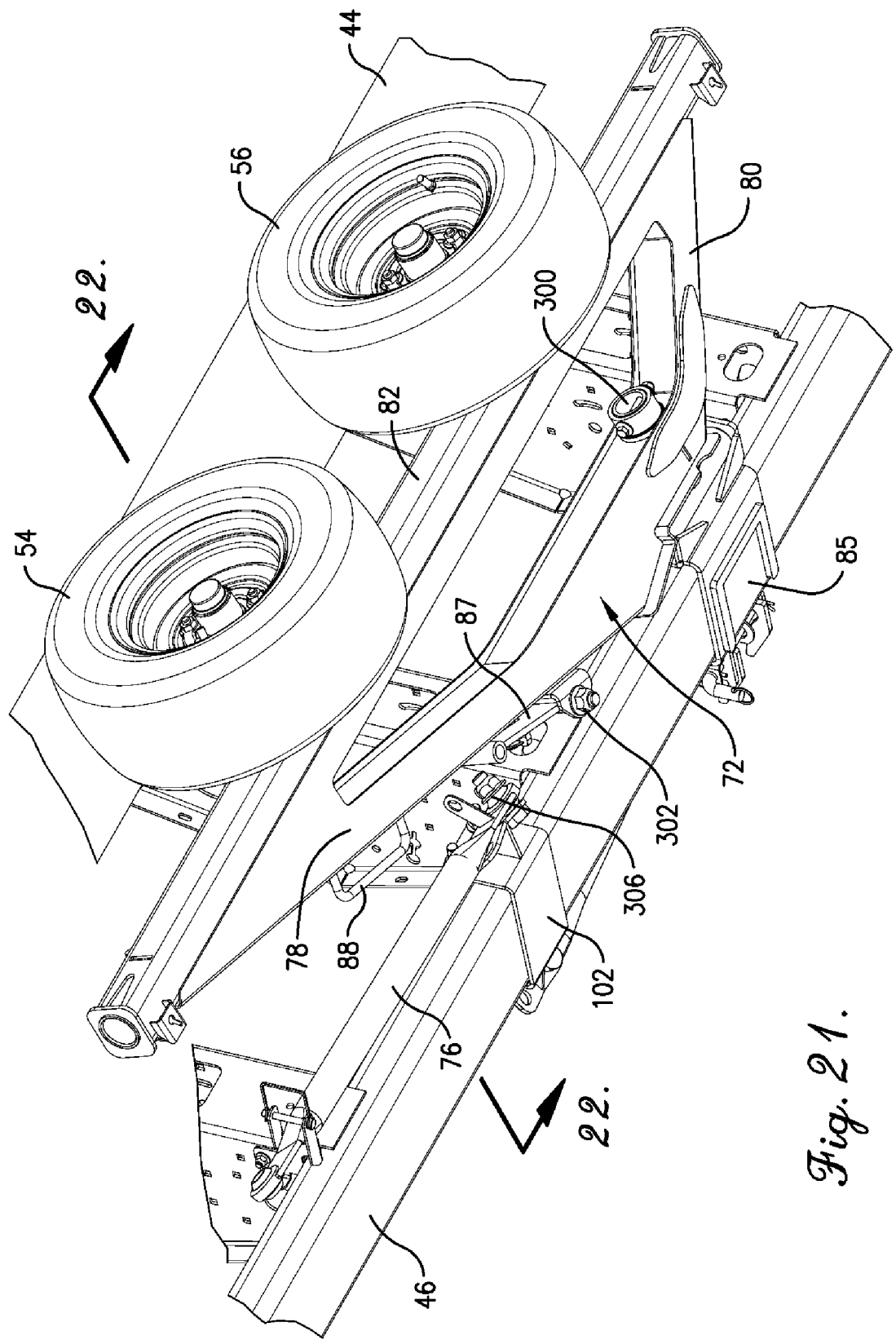
Figure 22:
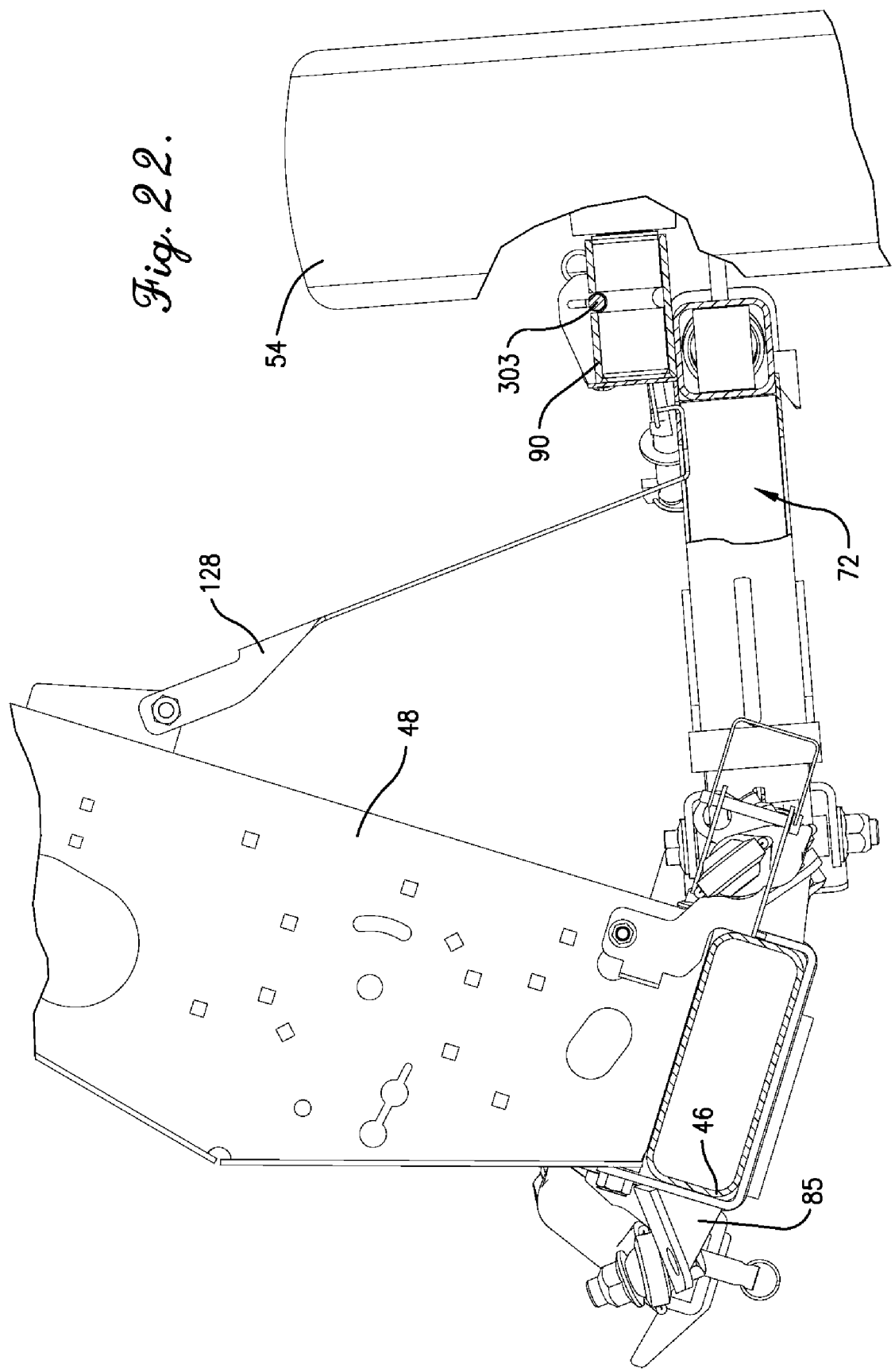

FIG. 18 is an enlarged, fragmentary, partial cutaway, side sectional view of the portion of the header transport assembly shown in FIGS. 16 and 17, the view similar in some respects to the view of FIG. 8, particularly illustrating details of structure of components of the portion of the header transport assembly including the front wheel supporting assembly disposed in the field position and in a stored condition for field operations;

FIG. 19 is a fragmentary, left front isometric view of a portion of the header transport assembly, similar to the portion shown in FIG. 14, but depicted with components of the portion of the header transport assembly including the rear wheel supporting assembly disposed in the field position and in a stored condition for field operations;

FIG. 20 is a fragmentary, right rear isometric view of the portion of the header transport assembly shown in FIG. 19, depicted with many components of the portion of the header transport assembly including the rear wheel supporting assembly disposed in the field position and in a stored condition for field operations, but depicted with one wheel removed from the stored condition to show details of construction;

FIG. 21 is a fragmentary, left rear isometric view of the portion of the header transport assembly shown in FIG. 19, depicted with components of the portion of the header transport assembly including the rear wheel supporting assembly disposed in the field position and in a stored condition for field operations; and FIG. 22 is an enlarged, fragmentary, partial cutaway, side sectional view of the portion of the header transport assembly shown in FIGS. 19-21, the view taken along the line 22-22 of FIG. 21, particularly illustrating details of structure of components of the portion of the header transport assembly including the rear wheel supporting assembly disposed in the field position and in a stored condition for field operations.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
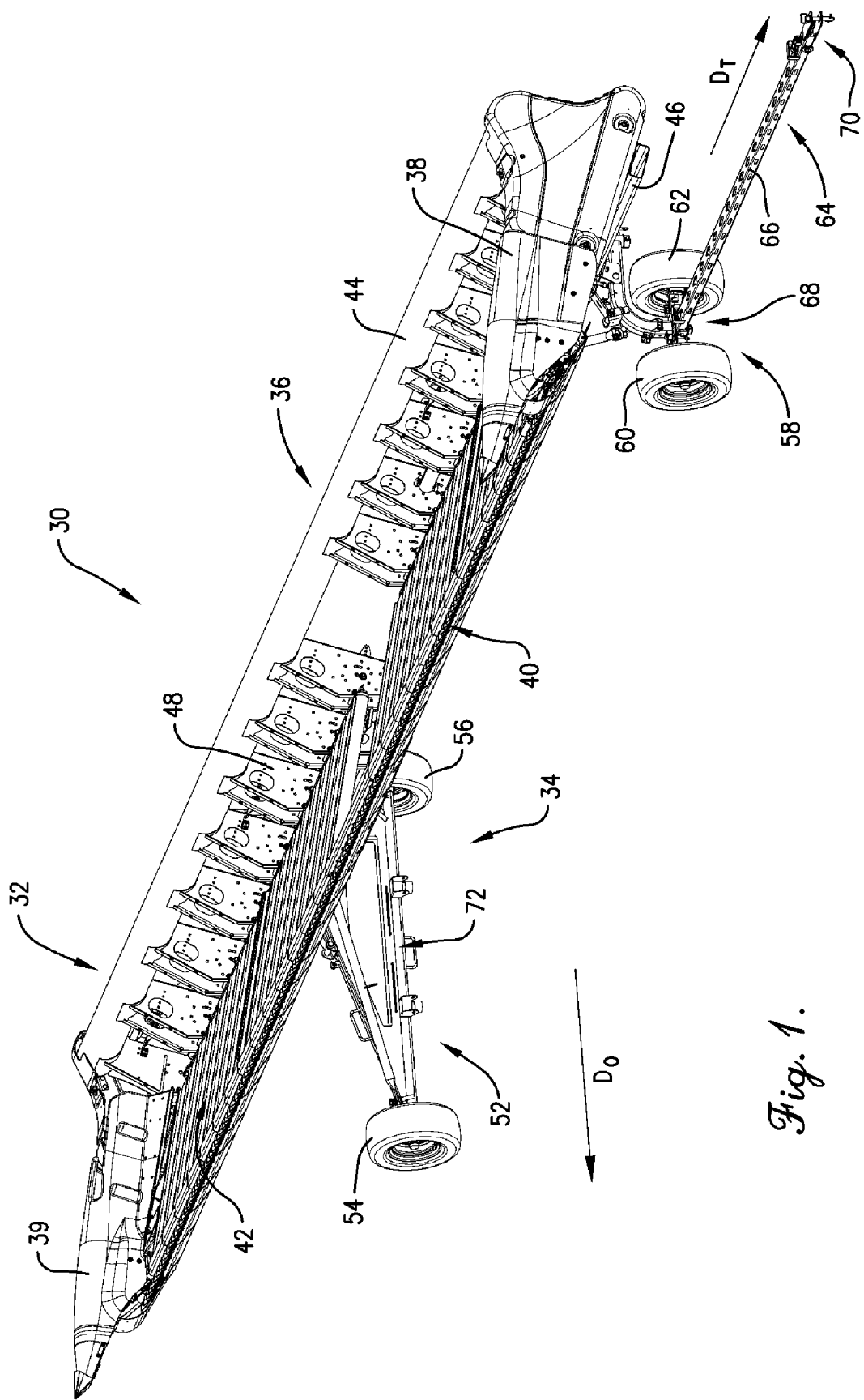
FIG. 1 is a left front isometric view of an agricultural header assembly constructed in accordance with the principles of the present invention, depicted with a header transport assembly disposed in a transport position, with various conventional components removed to reveal structural details of the header assembly.
Figure 2:
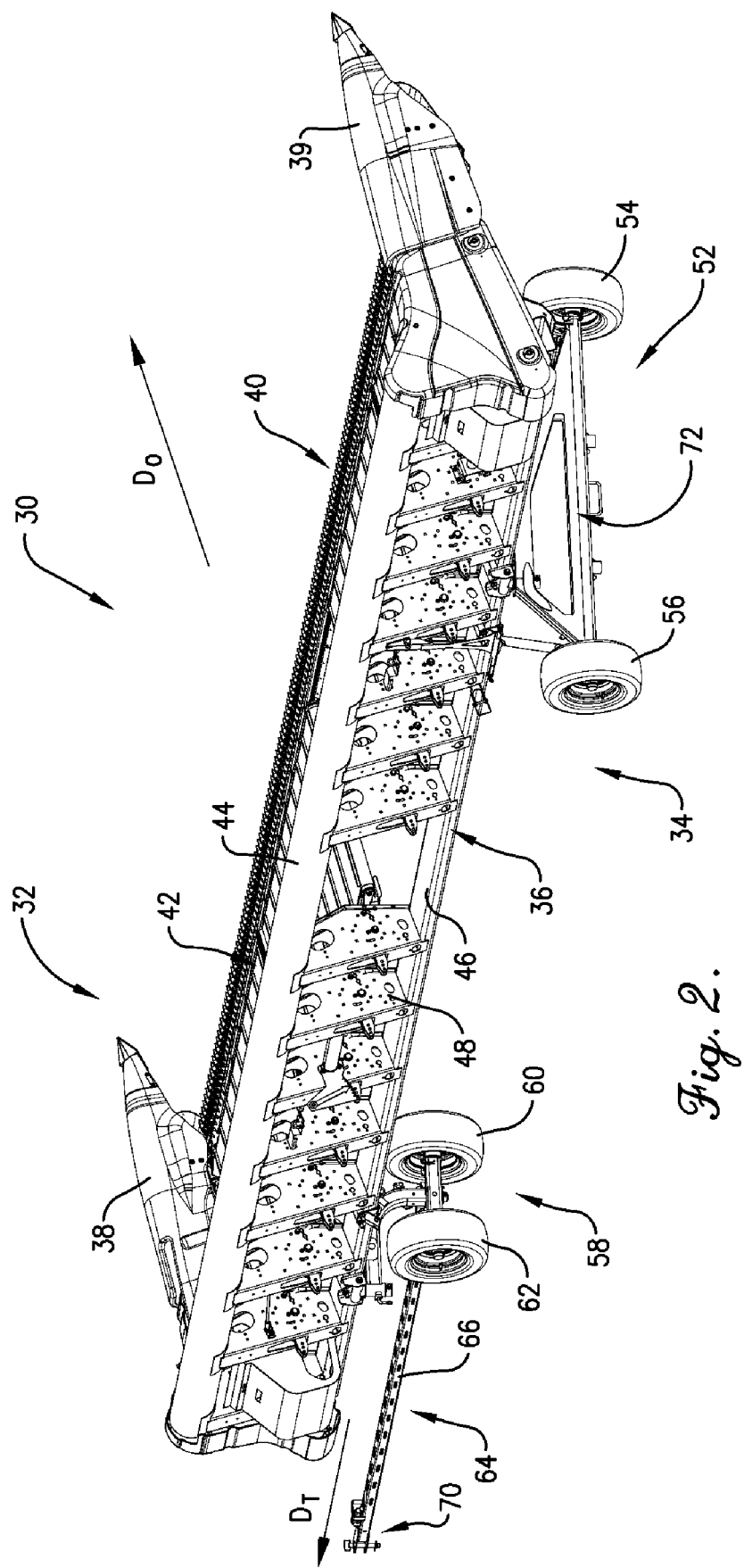
FIG. 2 is a right rear isometric view of the agricultural header assembly shown in FIG. 1, depicted with the header transport assembly disposed in the transport position.

With initial reference to FIGS. 1 and 2, an agricultural header assembly 30 constructed in accordance with the principles of an embodiment of the present invention is configured to be carried across a field by an implement (not shown), such as a self-propelled combine. The header assembly 30 is generally configured for cutting and conveying crop material during field operations by being advanced in a generally forward normal operational direction $D_O$ when carried by the implement.

Ordinarily, severed crop material is conveyed toward a generally central feederhouse (not shown) to be further processed by other combine components (not shown) in order to produce grain. It is noted, however, that at least some aspects of the present invention could also be used in other implements, such as a mower, swather, or windrower (where material may be conveyed in a direction other than centrally), as will be readily appreciated by one of ordinary skill in the art upon review of this disclosure. The header assembly 30 is also generally configured for movement from field to field, in a generally lateral transport direction $D_T$ when removed from the implement.

The agricultural header assembly 30 broadly includes a header 32 and a header transport assembly 34. The header 32 is operable to cut and convey crop material as the header assembly 30 is moved across the field. As is generally customary, the header 32 includes a header frame 36 disposed generally along a rear margin of the header 32, end crop dividers 38, 39 disposed generally along opposite side margins of the header 32, a crop-cutting assembly 40 disposed generally along a front margin of the header 32, and a crop-conveying assembly 42 disposed generally behind the crop-cutting assembly 40.

The header frame 36 preferably includes an upper beam 44 disposed generally along an upper margin of the header 32 and extending laterally across the entire width of the header 32 relative to the normal operational direction $D_O$. The header frame 36 preferably also includes a rigid lower beam 46 disposed generally along a lower margin of the header 32 that likewise extends laterally across the full width of the header 32 relative to the normal operational direction $D_O$. It is noted, however, that either or both of the upper beam 44 and the rigid lower beam 46 may alternatively extend only partially across the width of the header 32, or may comprise multiple discrete beam sections, without departing from the teachings of the present invention. The header frame 36 further includes a plurality of generally upright channels 48 that interconnect the upper beam 44 and the rigid lower beam 46 along the rear margin of the header 32 at spaced locations thereacross.

The illustrated crop-cutting assembly 40 is preferably substantially flexible, such that the crop-cutting assembly 40 is configured to "float" relative to the rigid lower beam 46. Similarly, the illustrated crop-conveying assembly 42 is preferably substantially flexible, such that the crop-conveying assembly 42 is configured to "float" relative to the rigid lower beam 46. Thus, the illustrated header 32 is a so-called "flexible header" that is configured to closely follow an undulating ground contour. Given the flexible nature of many of the components of the header 32, one of ordinary skill in the art will readily appreciate that, except for the rigid lower beam 46, the header 32 is substantially devoid of any other rigid mounting structure along the lower margin thereof, particularly in the fore-and-aft direction.

It is noted that additional structural and operational details of one example of the flexible header 32 depicted herein for use with the header transport assembly 34 are described in detail in U.S. patent application Ser. No. 12/118,474 (the '474 application). The '474 application, entitled Draper Belt with Crop-Retaining Rib, filed May 9, 2008, and assigned of record to the same assignee of record as the present application, is hereby incorporated by reference in its entirety, to the extent not inconsistent with the present disclosure.

Figure 3:
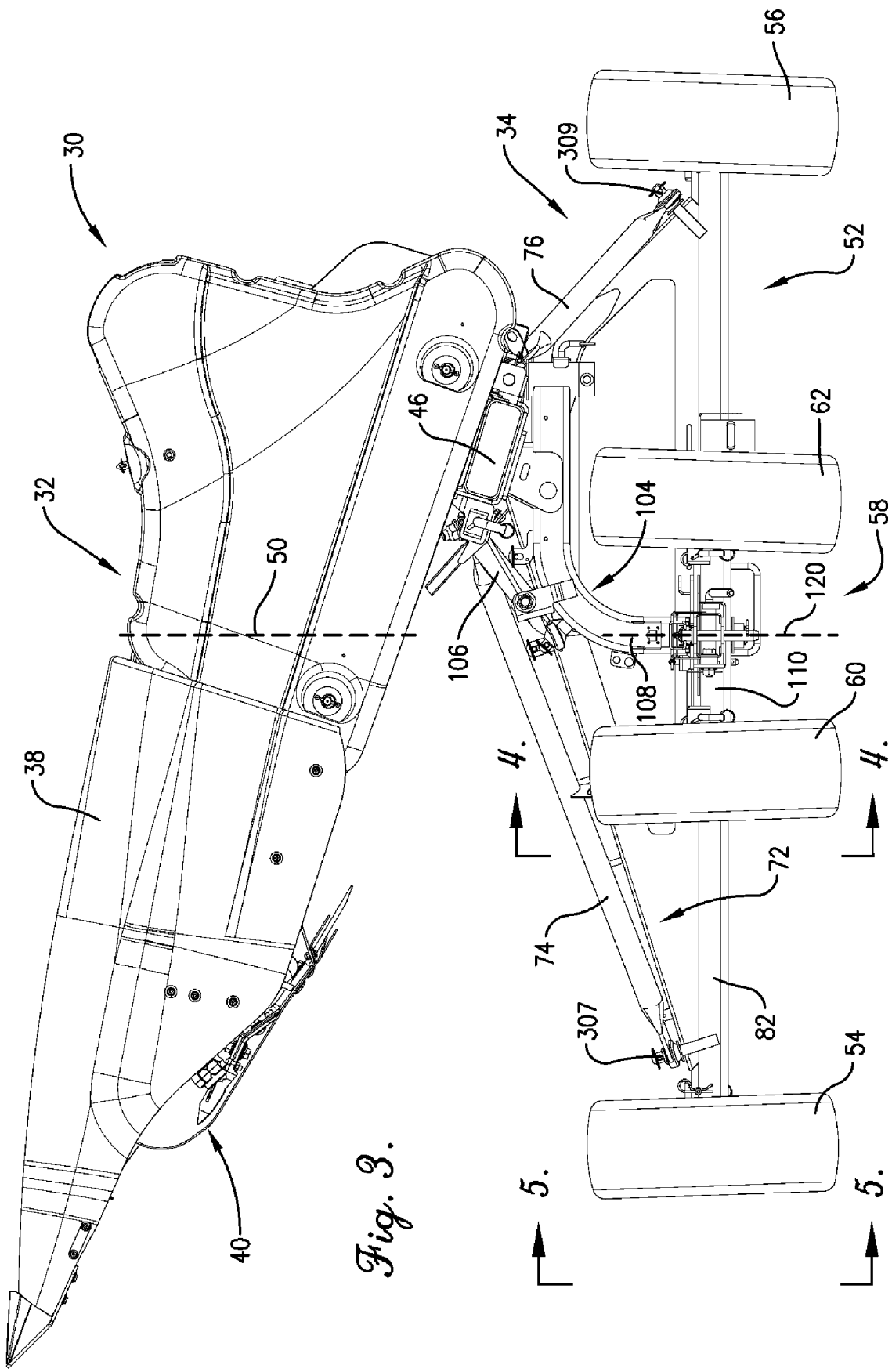
FIG. 3 is an enlarged, left side elevational view of the agricultural header assembly shown in FIGS. 1 and 2, depicted with the header transport assembly disposed in the transport position.

The header 32 is depicted in FIGS. 1-3 in a transport orientation in which the header 32 can be readily attached or removed from the implement (not shown) by raising or lowering a header-coupling portion of the implement (such as the feederhouse), as will be readily appreciated by one of ordinary skill in the art upon review of this disclosure. In more detail, the transport orientation is further defined by a condition in which the rigid lower beam 46 is out of vertical alignment with the header center of gravity 50. As will be readily understood by one of ordinary skill in the art, the front margin of the header 32 is generally tilted upwardly relative to the rear margin of the header 32 when the header 32 is in the transport orientation.

As can be seen particularly in FIG. 3, it may be theoretically possible to rotate the header 32 to further tilt the front margin thereof in an effort to vertically align the header center of gravity 50 with the rigid lower beam 46, although such rotation of the header 32 is typically beyond the capability of the implement (not shown). Moreover, as will be readily appreciated by one of ordinary skill in the art, orienting the header 32 in such theoretical alignment would make the header 32 detrimentally unstable for transport. Accordingly, as used herein, the term transport orientation is intended to mean a condition in which the rigid lower beam 46 is out of vertical alignment with the header center of gravity 50, and in which the implement (not shown) can position the header 32.

Turning now to structural details of the header transport assembly 34 operable to support the header 32 in the transport orientation when the header 32 is removed from the implement (not shown), the depicted header transport assembly 34 broadly includes a first wheel supporting assembly 52 carrying a first pair of spaced apart wheels 54, 56. As described in detail below, the first wheel supporting assembly 52 is shiftably connected to the rigid lower beam 46 for movement between a transport position (see FIGS. 1-3, 5, 7, and 10) and a field position (see FIGS. 19-22), with the first pair of wheels 54, 56 being configured for rolling engagement with the ground when the first wheel supporting assembly 52 is in the transport position.

In the depicted embodiment, the header transport assembly 34 also preferably includes a second wheel supporting assembly 58 carrying a second pair of spaced apart wheels 60, 62. The second wheel supporting assembly 58 is also shiftably connected to the rigid lower beam 46 for movement between the transport position (see FIGS. 1-4, 6, and 8) and the field position (see FIGS. 15-18), with the second pair of wheels 60, 62 being likewise configured for rolling engagement with the ground when the second wheel supporting assembly 58 is in the transport position. It is noted that in the depicted embodiment, the first pair of spaced apart wheels 54, 56 are preferably disposed further apart from one another than are the second pair of spaced apart wheels 60, 62.

As shown in FIGS. 1 and 2, the depicted header transport assembly 34 also includes a tongue assembly 64 including an elongated tongue element 66. The elongated tongue element 66 is configured to be pulled by a vehicle (such as a tractor or truck) in the transport direction $D_T$. The elongated tongue element 66 presents opposite end margins 68, 70, with one end margin 68 being connected to the second wheel supporting assembly 62, and the other end margin 70 being configured for connection to the vehicle (not shown) in a manner generally known in the art.

In the illustrated embodiment, the tongue assembly 64 is connected to the second wheel supporting assembly 62 for towing movement in the transport direction $D_T$, such that the second wheel supporting assembly 62 is generally configured as the front wheel supporting assembly and the first wheel supporting assembly 56 is generally configured as the rear wheel supporting assembly. It is noted that an alternative embodiment of the header transport assembly 34 (not shown) may omit the second wheel supporting assembly 62, and provide only the first wheel supporting assembly 56, without departing from the teachings of the present invention. In such an alternative embodiment (not shown), the tongue assembly 64 may be connected directly to the rigid lower beam 46, as will be readily appreciated by one of ordinary skill in the art upon review of this disclosure.

With attention now to FIGS. 1-3, 5, 7, and 10, additional details of the first wheel supporting assembly 52 and the first pair of spaced apart wheels 54, 56 will be described. The first wheel supporting assembly 52 generally includes a first support framework 72 and a pair of first stabilizer bars 74, 76. The first support framework 72 includes a pair of framework support arms 78, 80 and a first common axle bar 82 disposed along a lower margin of the first support framework 72. It is noted that in the depicted embodiment, the first support framework 72 is preferably a substantially unitary structure.

The framework support arms 78, 80 extend generally transverse to the rigid lower beam 46 when the first wheel supporting assembly 52 is in the transport position. In the depicted embodiment, one of the framework support arms 78 is longer than the other of the framework support arms 80. Each framework support arm 78, 80 presents opposite end margins, with one of each of the end margins intersecting the common axle bar 82. The other of each of the end margins of the framework support arms 78, 80 preferably come together at an apex 84 disposed at a generally upper margin of the first support framework 72. The apex 84 of the first support framework 72 is operably secured to the rigid lower beam 46 at a first common connection location 86 for shiftable connection thereto between the transport and field positions, as described in detail below.

Figure 10:
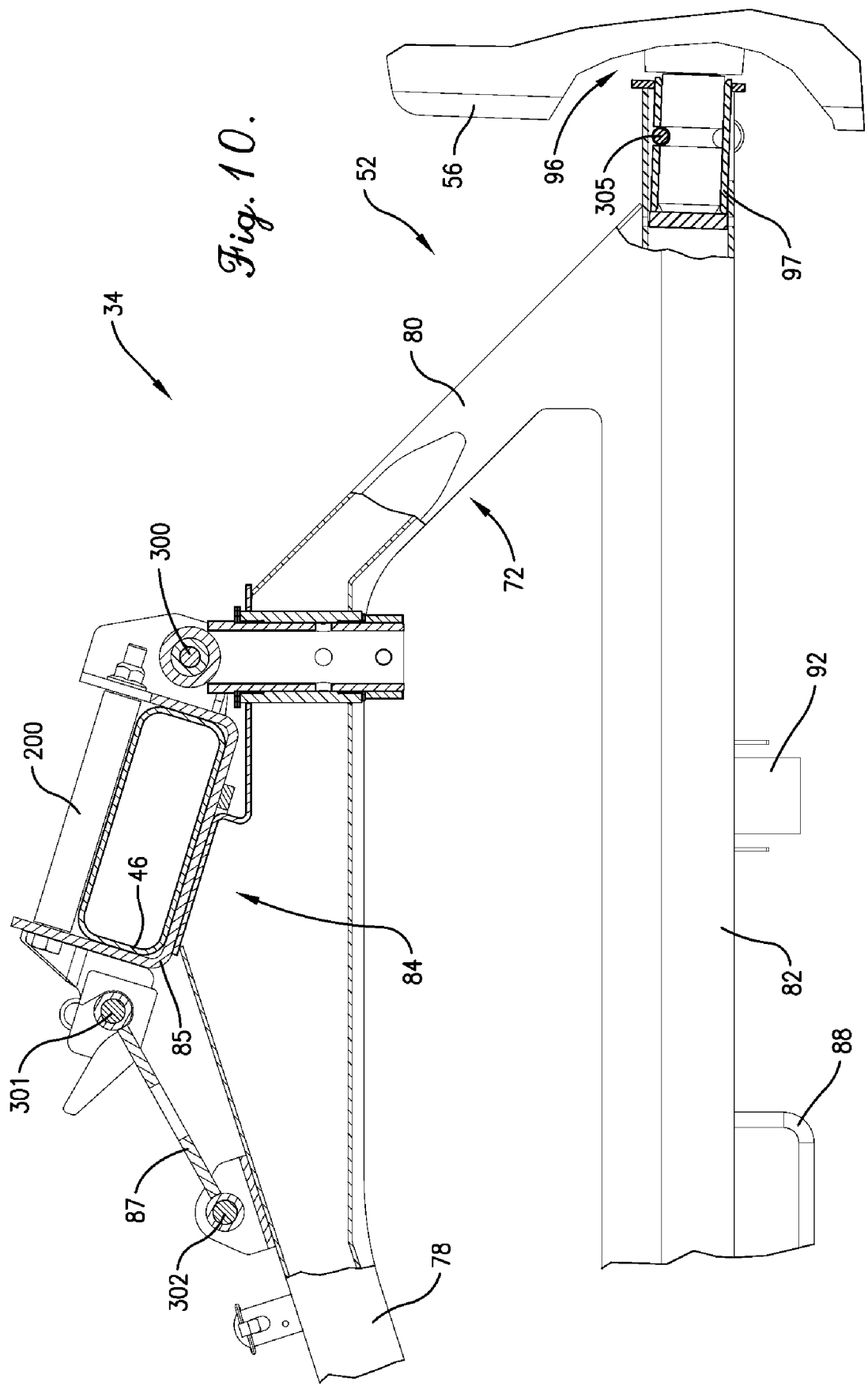
FIG. 10 is an enlarged, fragmentary, side sectional view of the agricultural header assembly shown in FIGS. 1-3, the view taken along the line 10-10 of FIG. 5, particularly illustrating details of internal structure of the portion of the header transport assembly including the rear wheel supporting assembly disposed in the transport position.

With reference specifically to FIG. 10, a first bracket 85 is secured to the rigid lower beam 46 at the first common connection location 86 with a plurality of fastener assemblies 200, such as bolt-and-nut assemblies. The first support framework 72 is operably secured to the rigid lower beam 46 at the first common connection location 86 by connection through a first multi-pivoting joint 300 that interconnects one side of the first bracket 85 and a portion of the first support framework 72 disposed on one side of the apex 84. A first retaining plate 87 is connected to the first support framework 72 at a first swing pivot 302 disposed on the other side of the apex 84. In the transport position, the first retaining plate 87 is operably connected to the other side of the first bracket 85 with a pin connection assembly 301, such as a clevis pin held securely in place with a cotter pin, as will be readily understood by one of ordinary skill in the art upon review of this disclosure.

In this manner, the first support framework 72 is operably secured to the rigid lower beam 46 at the first common connection location 86 when in the transport position, but is also shiftable into the field position without the use of tools, as will be readily appreciated by one of ordinary skill in the art upon review of this disclosure. The operation of moving the first support framework 72 from the transport position to the field position is described in further detail below.

The first support framework 72 also preferably includes a plurality of handles 88 to facilitate easier manual manipulation of the first support framework 72 between the transport and field positions, as will be readily appreciated by one of ordinary skill in the art upon review of this disclosure. Finally, the first support framework 72 also preferably includes a pair of wheel storage brackets 90, 92 disposed along the common axle bar 82. The wheel storage brackets 90, 92 facilitate storage of the first pair of wheels 54, 56 thereon when the first support framework 72 is disposed in the field position, as described in detail below.

Each of the first pair of spaced apart wheels 54, 56 is supported for rotation about a respective hub assembly 94, 96. Each of the hub assemblies 94, 96 is connected to an opposite end margin of the first common axle bar 82, so that the first pair of spaced apart wheels 54, 56 is carried by the first wheel supporting assembly 52 for rotation thereon when the first wheel supporting assembly 52 is in the transport position. In more detail, and with reference specifically to FIGS. 7 and 10, a non-rotatable portion 95, 97 of each of the respective hub assemblies 94, 96 is received within an open receiving portion of a respective one of the opposite end margins of the first common axle bar 82.

Each of the non-rotatable portions 95, 97 of the hub assemblies 94, 96 is secured in place with a pin connection assembly 303, 305, such as a clevis pin held securely in place with a cotter pin, as will be readily understood by one of ordinary skill in the art upon review of this disclosure. In this manner, each of the first pair of spaced apart wheels 54, 56 is removable from the first common axle bar 82 without the use of tools, as will be readily appreciated by one of ordinary skill in the art.

In the depicted embodiment, the first pair of spaced apart wheels 54, 56 are disposed for rotation along a first common axis 98, with the first common axle bar 82 being disposed along the first common axis 98. As will be readily appreciated by one of ordinary skill in the art upon review of this disclosure, the first common axis 98 (and the first common axle bar 82) are generally orthogonal to the direction of extension of the rigid lower beam 46 when the first wheel supporting assembly 52 is in the transport position.

Figure 7:
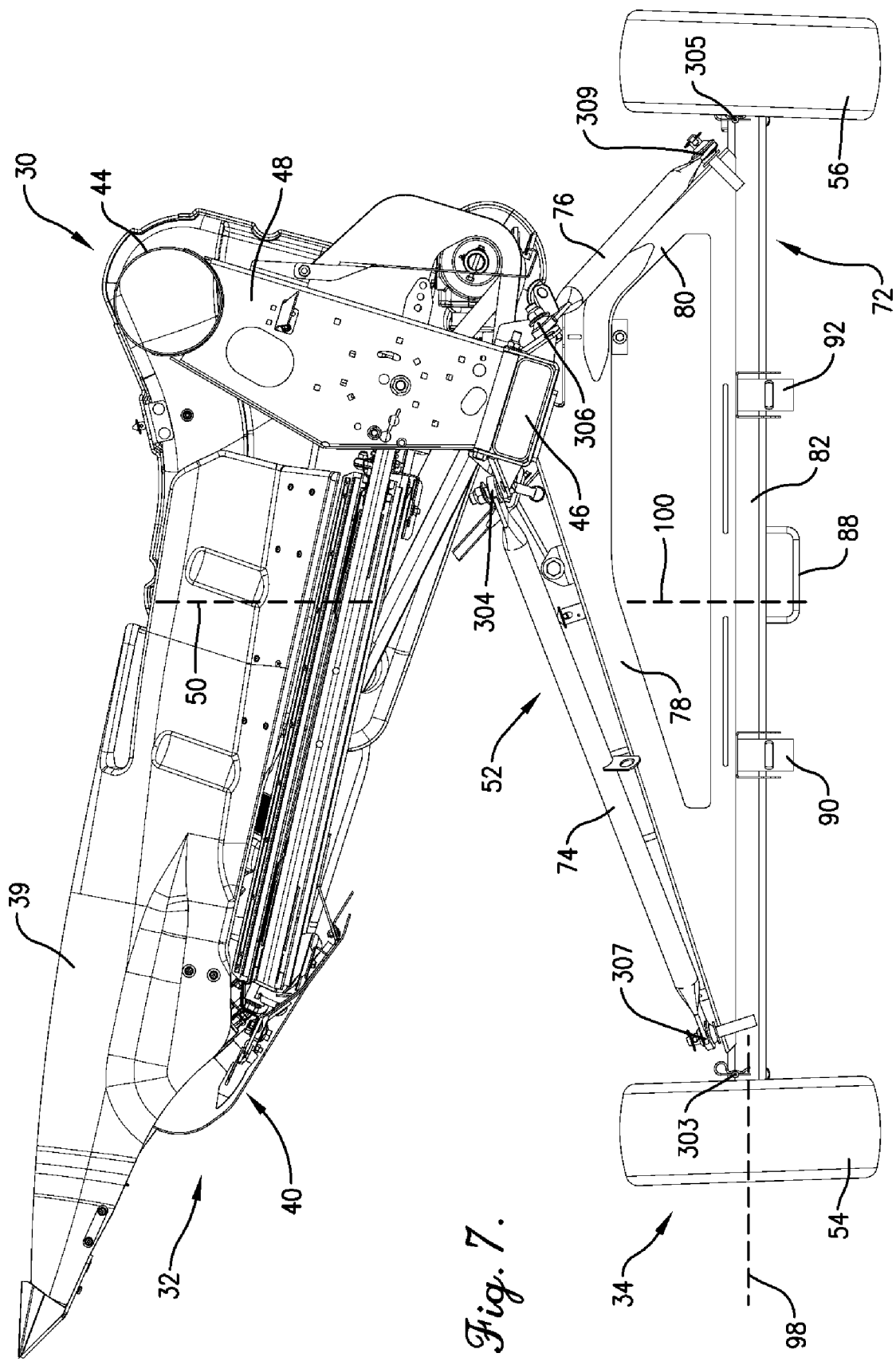
FIG. 7 is a left side sectional view of the agricultural header assembly shown in FIGS. 1-3, the view taken along the line 7-7 of FIG. 5, particularly illustrating an elevational view of the portion of the header transport assembly including the rear wheel supporting assembly disposed in the transport position.

With specific reference to FIGS. 3 and 7, the first pair of spaced apart wheels 54, 56 cooperatively define a first midpoint 100 therebetween when the wheels 54, 56 are in the transport position. The first midpoint 100 is disposed in general vertical alignment with the header center of gravity 50 when the header 32 is in the transport orientation. In this way, the header 32 is substantially balanced on the header transport assembly 34 when the first wheel supporting assembly 52 is in the transport position. As can be seen particularly in FIGS. 3 and 7, one of the first wheels 56 is disposed closer to the rigid lower beam 46 than is the other of the first wheels 54.

Finally, with reference particularly to FIGS. 5 and 7, the pair of first stabilizer bars 74, 76 will be described when the first wheel supporting assembly 52 is in the transport position. Each of the first stabilizer bars 74, 76 extends from a portion of the first support framework 72 to the rigid lower beam 46. In more detail, one of the first stabilizer bars 74 extends from a portion of the support arm 78 adjacent a respective one of the first pair of spaced apart wheels 54 to the rigid lower beam 46 and connects thereto at a location inboard of the first common connection location 86; that is, at a location closer toward the lateral center of the header 32 than the first common connection location 86. Similarly, the other of the first stabilizer bars 76 extends from a portion of the support arm 80 adjacent a respective other of the first pair of spaced apart wheels 56 to the rigid lower beam 46 and connects thereto at a location inboard of the first common connection location 86; that is, at a location closer toward the lateral center of the header 32 than the first common connection location 86.

As with the framework support arms 78, 80, one of the first stabilizer bars 74 is longer than the other of the first stabilizer bars 76. In the depicted embodiment, both of the first stabilizer bars 74, 76 connect to the rigid lower beam 46 at a common bracket 102, although distinct connection points along the rigid lower beam 46 for each of the first stabilizer bars 74, 76 would be firmly within the ambit of the present invention.

Figure 5:
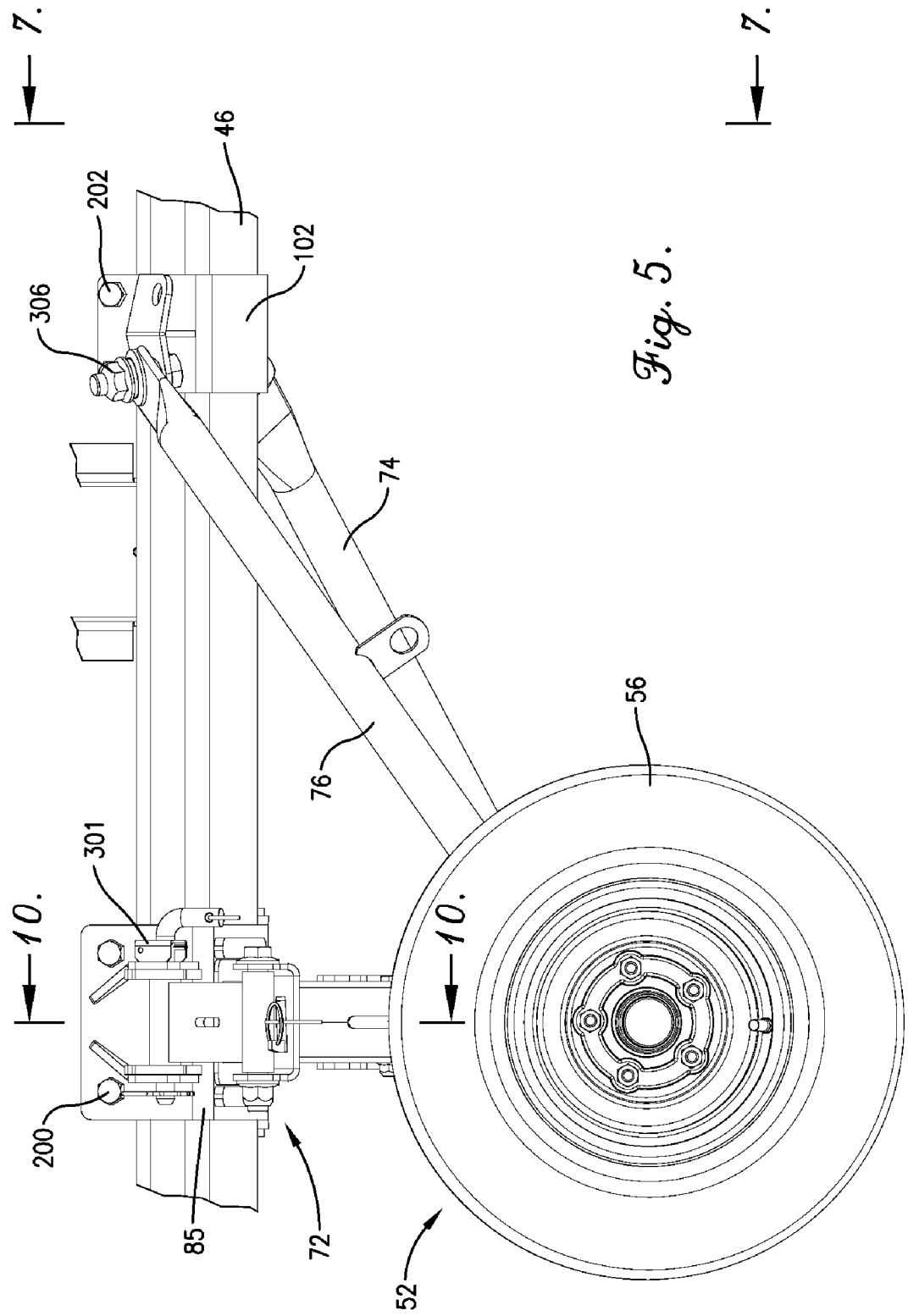
FIG. 5 is an enlarged, fragmentary, side sectional view of the agricultural header assembly shown in FIGS. 1-3, the view taken along the line 5-5 of FIG. 3, particularly illustrating an elevational view of details of another portion of the header transport assembly including a rear wheel supporting assembly disposed in the transport position.

In more detail, and with reference specifically to FIGS. 3, 5, and 7, the common bracket 102 is secured to the rigid lower beam 46 with a plurality of fastener assemblies 202, such as bolt-and-nut assemblies. One of the first stabilizer bars 74 is interconnected between the portion of the support arm 78 and the common bracket 102 for shiftable movement between the transport and field positions. In the transport position, as shown in FIGS. 3, 5, and 7, the first stabilizer bar 74 is connected at one end to the common bracket 102 at a swing pivot 304, and is connected at the other end to the portion of the support arm 78 with a pin connection assembly 307, such as a clevis pin held securely in place with a cotter pin, as will be readily understood by one of ordinary skill in the art upon review of this disclosure.

Likewise, the other of the first stabilizer bars 76 is interconnected between the portion of the support arm 80 and the common bracket 102 for shiftable movement between the transport and field positions. In the transport position, as shown in FIGS. 3, 5, and 7, the second stabilizer bar 76 is connected at one end to the common bracket 102 at a swing pivot 306, and is connected at the other end to the portion of the support arm 80 with a pin connection assembly 309, as will be readily understood by one of ordinary skill in the art upon review of this disclosure. In this manner, the first stabilizer bars 74, 76 are removable from the portions of the support arms 78, 80 to be shiftable into the field position without the use of tools, as will be readily appreciated by one of ordinary skill in the art.

With attention now to FIGS. 1-4, 6, and 8, additional details of the second wheel supporting assembly 58 and the second pair of spaced apart wheels 60, 62 will be described. The second wheel supporting assembly 58 generally includes a second support framework 104 and a second stabilizer bar 106. The second support framework 104 preferably includes a single arcuate support arm 108 and a second common axle bar 110 disposed along a lower margin of the second support framework 104.

The arcuate support arm 108 presents opposite end margins, with one of the end margins pivotally intersecting the second common axle bar 110 at a pivotal steering joint 308. The other one of the end margins of the arcuate support arm 108 is operably secured to the rigid lower beam 46 at a second common connection location 112 for shiftable connection thereto between the transport and field positions, as described in detail below.

With reference specifically to FIG. 8, a second bracket 111 is secured to the rigid lower beam 46 at the second common connection location 112 with a plurality of fastener assemblies 204, such as bolt-and-nut assemblies. The second support framework 104 is operably secured to the rigid lower beam 46 at the second common connection location 112 by connection through a second multi-pivoting joint 310 that interconnects one side of the second bracket 111 and a portion of the second support framework 104. A second retaining plate 113 is connected to the second support framework 104 at a second swing pivot 312. In the transport position, the second retaining plate 113 is operably connected to the other side of the second bracket 111 with a pin connection assembly 311, such as a clevis pin held securely in place with a cotter pin, as will be readily understood by one of ordinary skill in the art upon review of this disclosure.

In this manner, the second support framework 104 is operably secured to the rigid lower beam 46 at the second common connection location 112 when in the transport position, but is also shiftable into the field position without the use of tools, as will be readily appreciated by one of ordinary skill in the art upon review of this disclosure. The operation of moving the second support framework 104 from the transport position to the field position is described in further detail below.

Each of the second pair of spaced apart wheels 60, 62 is supported for rotation about a respective hub assembly 114, 116. Each of the hub assemblies 114, 116 is connected to an opposite end margin of the second common axle bar 110, so that the second pair of spaced apart wheels 60, 62 is carried by the second wheel supporting assembly 58 for rotation thereon when the second wheel supporting assembly 58 is in the transport position. In more detail, and with reference specifically to FIGS. 6 and 8, a non-rotatable portion 115, 117 of each of the respective hub assemblies 114, 116 is received within an open receiving portion of a respective one of the opposite end margins of the second common axle bar 110.

Each of the non-rotatable portions 115, 117 of the hub assemblies 114, 116 is secured in place with a pin connection assembly 313, 315, such as a clevis pin held securely in place with a cotter pin, as will be readily understood by one of ordinary skill in the art upon review of this disclosure. In this manner, each of the second pair of spaced apart wheels 60, 62 is removable from the second common axle bar 110 without the use of tools, as will be readily appreciated by one of ordinary skill in the art. In the depicted embodiment, the second pair of spaced apart wheels 60, 62 are disposed for rotation along a second common axis 118, with the second common axle bar 110 being disposed along the second common axis 118.

As will be readily appreciated by one of ordinary skill in the art upon review of this disclosure, the second common axis 118 (and the second common axle bar 110) can turn relative to the direction of extension of the rigid lower beam 46 when the second wheel supporting assembly 58 is in the transport position (due to the pivotal connection 308 between the second common axle bar 110 and the arcuate support arm 108), such that the header transport assembly 34 may be steered as it is pulled generally in the transport direction $T_D$.

Figure 6:
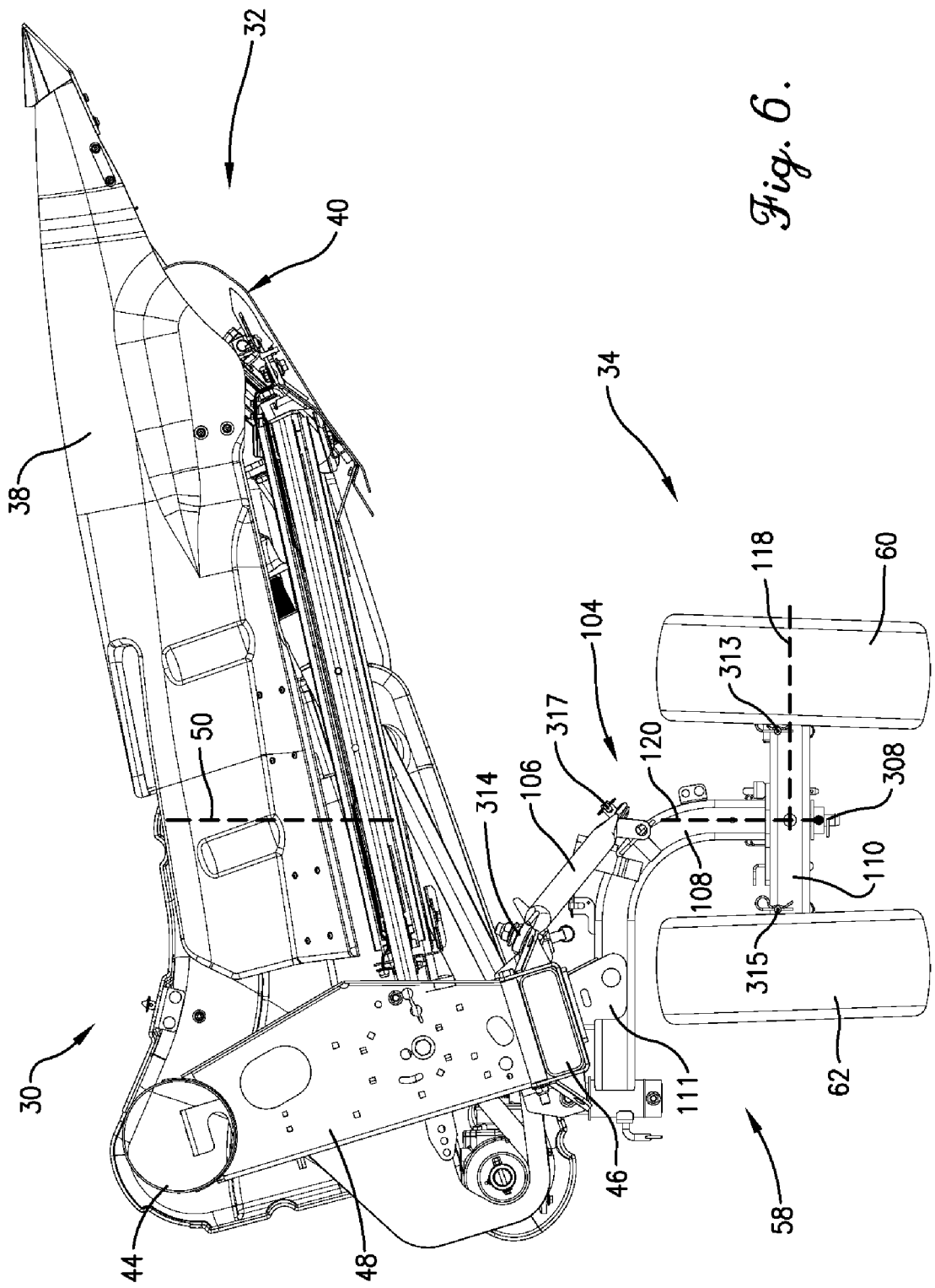
FIG. 6 is a right side sectional view of the agricultural header assembly shown in FIGS. 1-3, the view taken along the line 6-6 of FIG. 4, particularly illustrating an elevational view of the portion of the header transport assembly including the front wheel supporting assembly disposed in the transport position.

With specific reference to FIGS. 3 and 6, the second pair of spaced apart wheels 60, 62 cooperatively define a second midpoint 120 therebetween when the wheels 60, 62 are in the transport position. The second midpoint 120 is disposed in general vertical alignment with the header center of gravity 50 when the header 32 is in the transport orientation. In this way, the header 32 is substantially balanced on the header transport assembly 34 when the second wheel supporting assembly 58 is in the transport position. As can be seen particularly in FIGS. 3 and 6, one of the second wheels 62 is disposed closer to the rigid lower beam 46 then is the other of the second wheels 60.

Finally, with reference particularly to FIGS. 4 and 6, the second stabilizer bar 106 will be described when the second wheel supporting assembly 58 is in the transport position. The second stabilizer bar 106 extends from a portion of the second support framework 104 to the rigid lower beam 46. In more detail, the second stabilizer bar 106 extends from a portion of the arcuate support arm 108 along a curved portions thereof to the rigid lower beam 46 and connects thereto at a location inboard of the second common connection location 112; that is, at a location closer toward the lateral center of the header 32 and the second common connection location 112. In the illustrated embodiment, the first common connection location 86 and a second common connection location 112 are spaced laterally from one another along a length of the rigid lower beam 46.

In the depicted embodiment, the second stabilizer bar 106 connects to the rigid lower beam 46 at a second bracket 122. In more detail, and with reference specifically to FIGS. 3, 4, and 6, the second bracket 122 is secured to the rigid lower beam 46 with a plurality of fastener assemblies 206, such as bolt-and-nut assemblies. The second stabilizer bar 106 is interconnected between the portion of the second support framework 104 and the second bracket 122 for shiftable movement between the transport and field positions.

Figure 4:
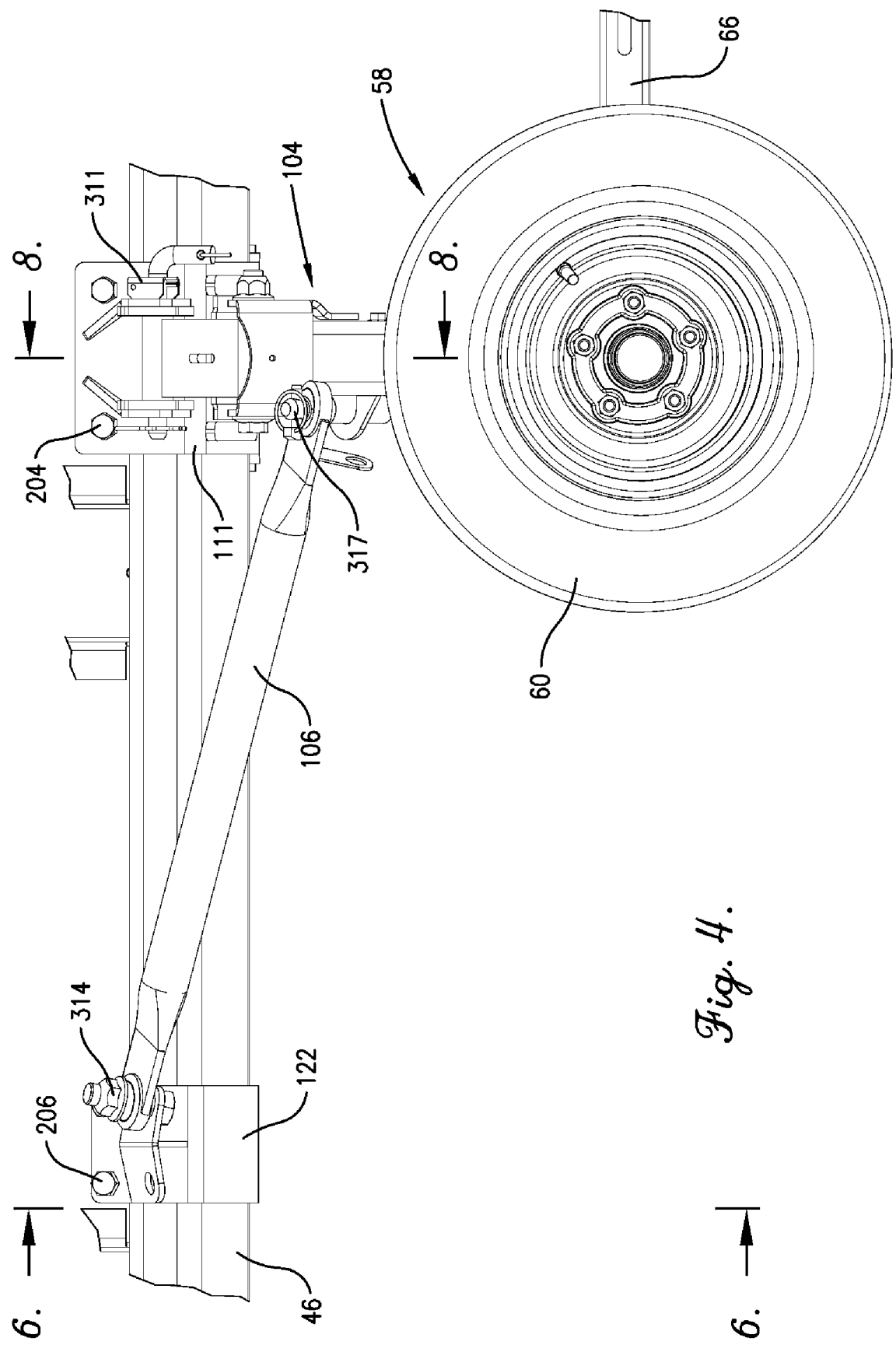
FIG. 4 is an enlarged, fragmentary, side sectional view of the agricultural header assembly shown in FIGS. 1-3, the view taken along the line 4-4 of FIG. 3, particularly illustrating an elevational view of details of a portion of the header transport assembly including a front wheel supporting assembly disposed in the transport position.

In the transport position, as shown in FIGS. 3, 4, and 6, the second stabilizer bar 106 is connected at one end to the second bracket 122 at a swing pivot 314, and is connected at the other end to the portion of the second support framework 104 with a pin connection assembly 317, such as a clevis pin held securely in place with a cotter pin, as will be readily understood by one of ordinary skill in the art upon review of this disclosure. In this manner, the second stabilizer bar 106 is removable from the portion of the second support framework 104 to be shiftable into the field position without the use of tools, as will be readily appreciated by one of ordinary skill in the art.

Figure 12:
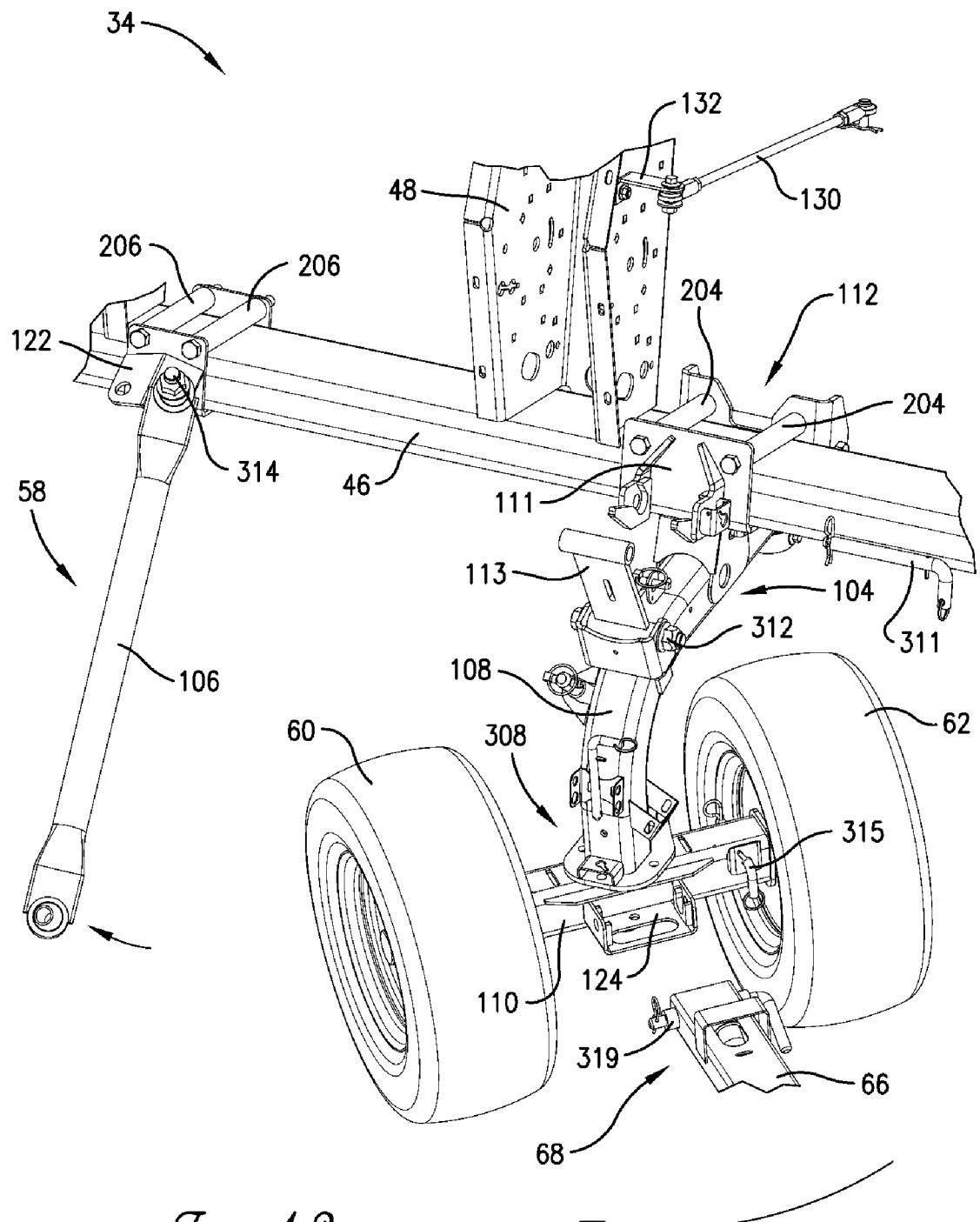
FIG. 12 is a fragmentary, isometric view of a portion of the header transport assembly, similar to the portion shown in FIG. 4, but depicted with components of the portion of the header transport assembly including the front wheel supporting assembly being moved from the transport position to the field position.

Finally, with reference quickly to FIG. 12, the one end margin 68 of the elongated tongue element 66 is removably connectable to the second wheel supporting assembly 62, as briefly described above. In more detail, the illustrated second common axle bar 110 includes a tongue receiving portion 124 disposed generally centrally therealong, and at a position spaced below the pivotal steering joint 308. The one end margin 68 of the elongated tongue element 66 is connected to the tongue receiving portion 124 with a pin connection assembly 319, such as a clevis pin held securely in place with a cotter pin, as will be readily understood by one of ordinary skill in the art upon review of this disclosure. In this manner, the elongated tongue element 66 is removable from the second wheel supporting assembly 62 without the use of tools, as will be readily appreciated by one of ordinary skill in the art.

The operation of switching the header transport assembly 34 from the transport position (as shown generally in FIGS. 1-8 and 10), to the illustrated field position where the wheel supporting assemblies 52, 58 are disposed in a stored condition for field operations (as shown generally in FIGS. 15-22) should be readily apparent from the foregoing and, therefore, will be described here only briefly.

It is noted, however, that the header transport assembly 34 could alternatively be removed from the header 32 entirely (rather than moved into the illustrated field position to be stored thereon, as described below) in order to be considered shiftable for field operations, without departing from the teachings of the present invention. In other words, the field position, as that term is used herein, may encompass any position other than the transport position, such that it remains firmly within the ambit of the present invention for the header transport assembly 34 to be shifted into the field position by simply removing the header transport assembly 34 from the header 32 (for example, to be stored in a remote location).

Initially, it is reiterated that when the header 32 is in the transport orientation and the header transport assembly 34 is in the transport position, the header 32 is substantially balanced on the header transport assembly 34 when the first and second wheel supporting assemblies 52, 58 are in the transport position. The header assembly 30 can then be towed by the tongue assembly 64 in the transport direction $D_T$. The operational description that follows will presume that the header transport assembly 34 is first in the transport position.

In order to shift the header transport assembly 34 from the transport position to the field position, the header 32 should be connected to the implement (such as a combine; not shown), so that the header 32 can be raised and positioned in the transport orientation by the implement. Once the header 32 is safely disposed in the transport orientation, the first and second wheel supporting assemblies 52, 58 can be shifted up into the field position, where the wheel supporting assemblies 52, 58 are raised and stored out of engagement with the ground, so that the header 32 can be used for field operations.

Figure 15:
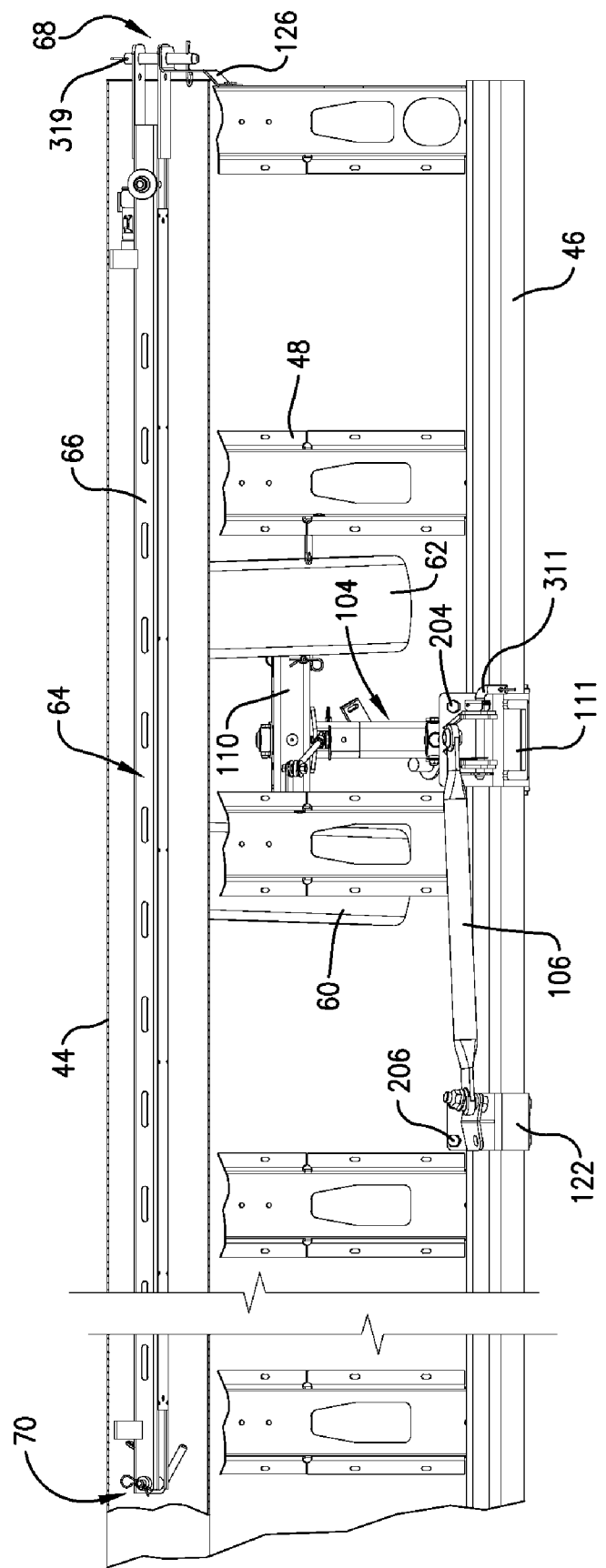
FIG. 15 is a fragmentary, partial sectional view of the agricultural header assembly shown in FIGS. 1-3, illustrating a generally elevational view of the header assembly, and particularly depicting components of the portion of the header transport assembly including the front wheel supporting assembly disposed in the field position and in a stored condition for field operations.

As a first step, the tongue assembly 64 can be removed from the second wheel supporting assembly 58. As shown in FIG. 12, the pin connection assembly 319 can be disengaged, as will be readily understood by one of ordinary skill in the art, and the end margin 68 of the elongated tongue element 66 can be removed from the tongue receiving portion 124 of the second wheel supporting framework 104. With specific reference to FIGS. 15 and 16, it is noted that the rigid upper beam 44 is typically hollow, such that the tongue assembly 64 can be stored therein. As depicted in FIGS. 15 and 16, the pin connection assembly 319 can be reinserted through the end margin 68 of the elongated tongue element 66 to connect the tongue assembly 64 to a tongue assembly storage bracket 126 disposed adjacent an end margin of the rigid upper beam 44.

Figure 11:
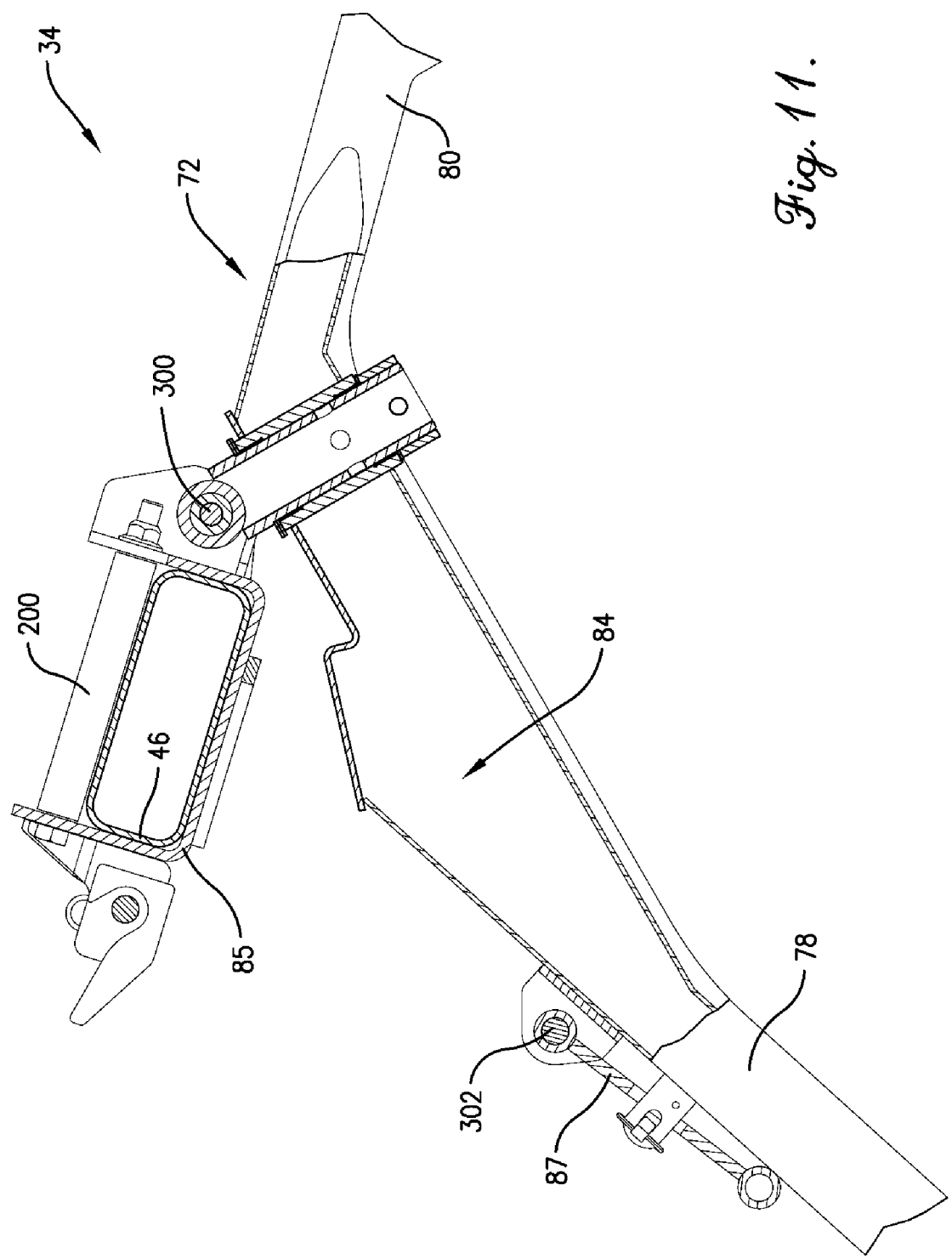
FIG. 11 is an enlarged, fragmentary, side sectional view of the portion of the header transport assembly shown in FIG. 10, but depicted with the rear wheel supporting assembly disposed intermediate the transport position and the field position.
Figure 13:
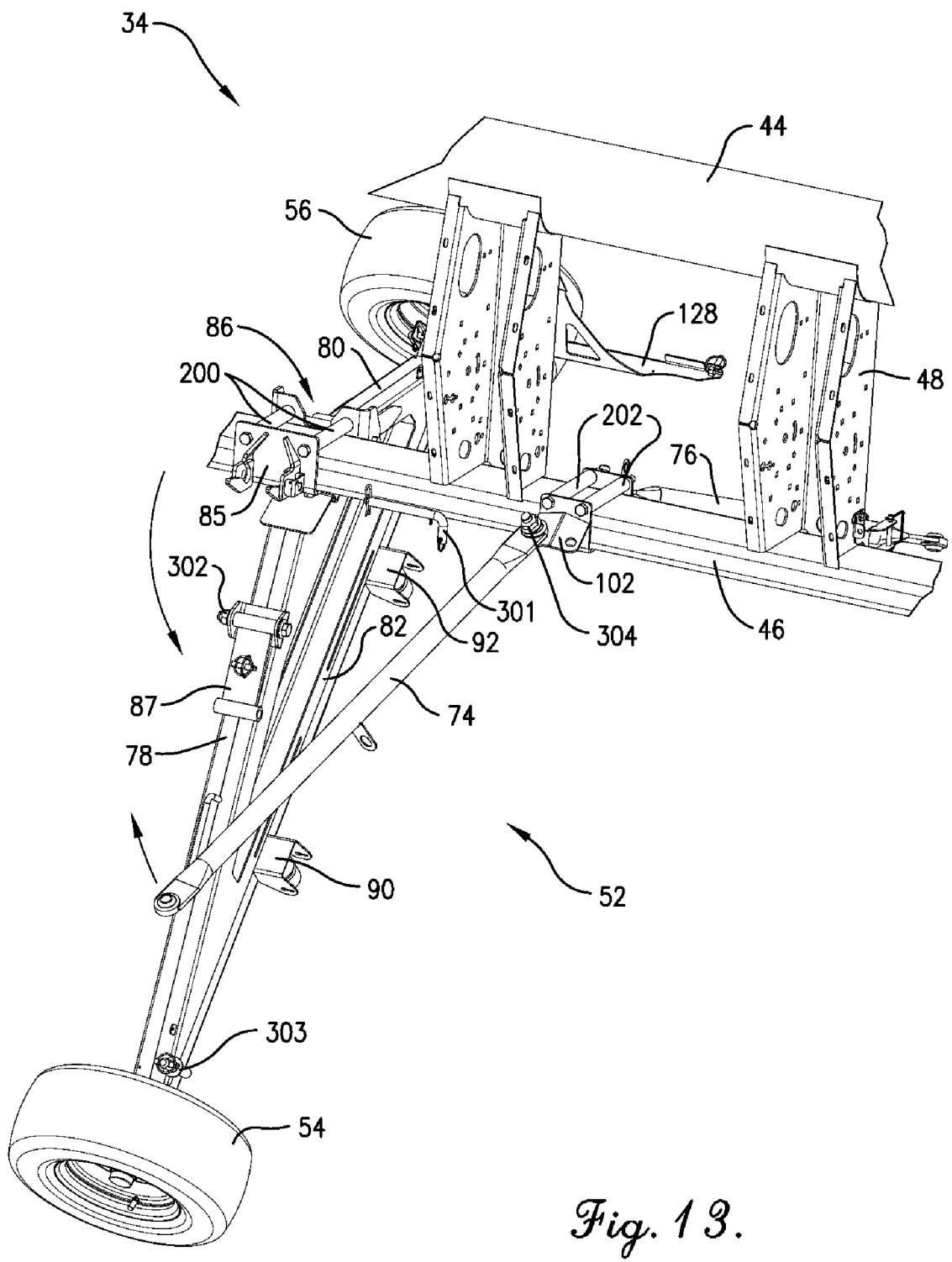
FIG. 13 is a fragmentary, isometric view of a portion of the header transport assembly, similar to the portion shown in FIG. 5, but depicted with components of the portion of the header transport assembly including the rear wheel supporting assembly being moved from the transport position to the field position.

Next, the first wheel supporting assembly 52 can be shifted from the transport position to the field position. With reference to FIGS. 11, 13, and 14, the first wheel supporting assembly 52 is moved into the field position depicted in FIGS. 19-22. First, the pin connection assemblies 303, 305 are disengaged, so that the first pair of wheels 54, 56 can be removed from the first support framework 72. Next, the pin connection assembly 309 is disengaged, so that the first stabilizer bar 76 can be swung away from the first support framework 72 about respective pivot connection 306. As shown in FIGS. 19-22, the first stabilizer bar 76 can be secured to appropriate portions of the first support framework 72 or the header 32, so that the first stabilizer bar 76 is disposed generally in line with the rigid lower beam 46. The first stabilizer bar 76 can be secured in such stored disposition by reinserting the pin connection assembly 309 through an appropriate storage bracket, as will be readily understood by one of ordinary skill in the art upon review of this disclosure and the accompanying drawings.

Following securement of the first stabilizer bar 76, the pin connection assembly 301 may be disengaged, so that the first retaining plate 87 can be removed from the first bracket 85. The first retaining plate 87 may then be secured to an appropriate storage bracket of the first support framework 72 (as shown in FIG. 13).

Next, the pin connection assembly 307 is disengaged, so that the first stabilizer bar 74 can be swung away from the first support framework 72 about respective pivot connection 304. As shown in FIGS. 19-22, the first stabilizer bar 74 can be secured to appropriate portions of the first assembly framework 72 or the header 32, so that the first stabilizer bar 74 is disposed generally in line with the rigid lower beam 46. The first stabilizer bar 74 can be secured in such stored disposition by reinserting the pin connection 307 through an appropriate storage bracket, as will be readily understood by one of ordinary skill in the art upon review of this disclosure and the accompanying drawings.

At this point, the first support framework 72 can swing downward about the multi-pivoting joint 300 (as shown in FIG. 11), and can further be rotated through an angle of approximately ninety degrees (90°) (as shown in FIGS. 13 and 14), to position the first support framework 72 in a storage position. A first assembly storage bracket 128 can be released from a storage position against the header 32 (as shown in FIG. 14) in order to retain the first support framework 72.

The first support framework 72 can then be swung into a storage disposition supported by the first assembly storage bracket 128 by using the handles 88, as will be readily understood by one of ordinary skill in the art upon review of this disclosure and the accompanying drawings. Once the first support framework 72 has been swung into the storage disposition and is supported by the first assembly storage bracket 128, the first support framework 72 can be secured in such disposition by reinserting appropriate pin connection assemblies through appropriate storage brackets, as will be readily appreciated by one of ordinary skill in the art.

Finally, the first pair of wheels 54, 56 can then be reconnected to the first support framework 72 by connecting the first pair of wheels 54, 56 to their respective wheel storage attachments 90, 92. The pin connection assemblies 303, 305 can be reused for this purpose, as will be readily appreciated by one of ordinary skill in the art (see specifically FIGS. 20 and 21).

Figure 9:
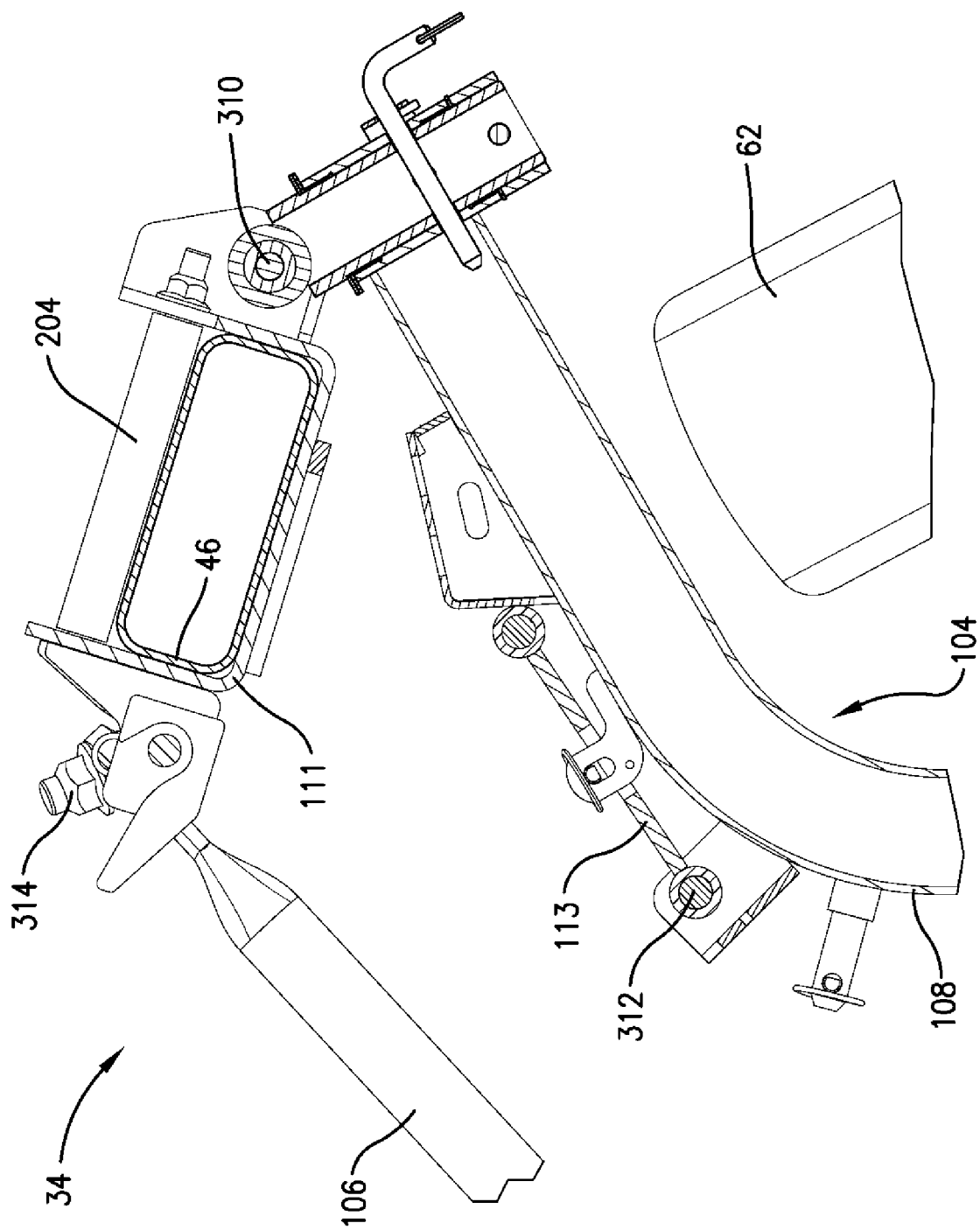
FIG. 9 is an enlarged, fragmentary, side sectional view of the portion of the header transport assembly shown in FIG. 8, but depicted with the front wheel supporting assembly disposed intermediate the transport position and a field position.

The second wheel supporting assembly 58 can similarly be shifted from the transport position to the field position. With reference to FIGS. 9 and 12, the second wheel supporting assembly 58 moves into the field position depicted in FIGS. 16-18. First, the pin connection assembly 317 is disengaged, so that the second stabilizer bar 108 can be swung away from the second support framework 104 about respective pivot connection 314. As shown in FIGS. 16-18, the second stabilizer bar 108 can be secured to appropriate portions of the second support framework 104 or the header 32, so that the second stabilizer bar 108 is disposed generally in line with the rigid lower beam 46. The second stabilizer bar 108 can be secured in such stored disposition by reinserting the pin connection assembly 317 through an appropriate storage bracket, as will be readily understood by one of ordinary skill in the art upon review of this disclosure and the accompanying drawings.

Following securement of the second stabilizer bar 108, the pin connection assembly 311 may be disengaged, so that the second retaining plate 113 can be removed from the second bracket 111. The second retaining plate 113 may then be secured to an appropriate storage bracket of the second support framework 104 (as shown in FIG. 17).

At this point, the second support framework 104 can swing downward about the multi-pivoting joint 310 (as shown in FIG. 12), and can further be rotated through an angle of approximately ninety degrees (90°) (as shown in the difference between FIG. 12 and FIG. 15), to position the second support framework 104 in a storage position. A second assembly storage retaining rod 130 can then be used to store the second assembly framework 104 in a storage disposition by securing the retaining rod 130 to a bracket 132 secured to a selected one of the rigid channels 48 (as shown in FIGS. 17 and 18), as will be readily understood by one of ordinary skill in the art upon review of this disclosure and the accompanying drawings.

It is noted that each of the second pair of wheels 60, 62 is generally retained at respective opposite end margins of the second common axle bar 110 (namely, in the same disposition as when in the transport position). It may be helpful, however, to temporarily remove either or both of the second pair of wheels 60, 62 in order to manipulate the second support framework 104 into the storage disposition, as will be readily appreciated by one of ordinary skill in the art.

In order to switch the header transport assembly 34 from the field position to the transport position, one need only reverse the procedure outlined above, as will be readily understood by one of ordinary skill in the art upon review of this disclosure.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An agricultural header assembly to be carried across a field by an implement in a normal operational direction and being removable from the implement for transport, said header assembly comprising:

a header operable to cut and convey crop as the header assembly is moved across the field, said header including— a header frame including a rigid beam extending laterally relative to the normal operational direction;

a crop-cutting assembly mounted to the header frame and extending laterally along the frame;

a crop-conveying assembly supported on the header frame rearwardly of the crop-cutting assembly and configured to convey crop severed by the crop-cutting assembly, said header being in a transport orientation when the rigid beam is out of vertical alignment with the header center of gravity; and a transport assembly operable to support the header in the transport orientation when the header assembly is removed from the implement, said transport assembly including— a first pair of spaced apart wheels shiftably connected to the rigid beam for movement between a transport position and a field position, said first pair of wheels defining a first midpoint therebetween when in the transport position, said first midpoint being disposed in general vertical alignment with the header center of gravity when the header is in the transport orientation to substantially balance the header on the transport assembly, with one of the first wheels being closer to the rigid beam than the other of the first wheels.

2. The agricultural header assembly as claimed in claim 1, said first pair of spaced apart wheels being disposed for rotation along a first common axis.

3. The agricultural header assembly as claimed in claim 2, said first common axis being generally orthogonal to the rigid beam.

4. The agricultural header assembly as claimed in claim 1, said transport assembly further including a first wheel supporting assembly carrying the first pair of spaced apart wheels for rotation thereon when in the transport position.

5. The agricultural header assembly as claimed in claim 4, said first wheel supporting assembly operably connecting the first wheels to the rigid beam at a first common connection location.

6. The agricultural header assembly as claimed in claim 5, said first pair of spaced apart wheels being disposed for rotation along a first common axis, said first wheel supporting assembly including a pair of support arms and a first common axle bar disposed along the first common axis, each support arm extending generally transverse to the rigid beam when in the transport position, each support arm presenting opposite end margins, with one of each of the end margins intersecting the first common axle bar.

7. The agricultural header assembly as claimed in claim 6, one of said support arms being longer than the other.

8. The agricultural header assembly as claimed in claim 5, said first wheel supporting assembly further including a pair of first stabilizer bars, with each of the stabilizer bars extending from a portion of one of the support arms adjacent a respective one of the first wheels to the rigid beam to connect thereto at a location inboard of the first common connection location.

9. The agricultural header assembly as claimed in claim 8, said transport assembly further including a storage bracket configured to carry the first wheel supporting assembly when in the field position.

10. The agricultural header assembly as claimed in claim 1, said transport assembly further including a second pair of spaced apart wheels shiftably connected to the rigid beam for movement between the transport and field positions, said second pair of wheels defining a second midpoint therebetween when in the transport position, said second midpoint being disposed in general vertical alignment with the header center of gravity when the header is in the transport orientation to substantially balance the header on the transport assembly, with one of the second wheels being closer to the rigid beam than the other of the second wheels.

11. The agricultural header assembly as claimed in claim 10, said first pair of spaced apart wheels being disposed for rotation along a first common axis, said second pair of spaced apart wheels being disposed for rotation along a second common axis, said first and second common axes being generally orthogonal to the rigid beam and spaced laterally from one another.

12. The agricultural header assembly as claimed in claim 10, said transport assembly further including a first wheel supporting assembly carrying the first pair of spaced apart wheels for rotation thereon when in the transport position, said transport assembly further including a second wheel supporting assembly carrying the second pair of spaced apart wheels for rotation thereon when in the transport position, said second pair of spaced apart wheels being disposed for rotation along a second common axis.

13. The agricultural header assembly as claimed in claim 12, said first wheel supporting assembly operably connecting the first wheels to the rigid beam at a first common connection location, said second wheel supporting assembly operably connecting the second wheels to the rigid beam at a second common connection location, said first and second common connection locations being spaced laterally from one another along the rigid beam.

14. The agricultural header assembly as claimed in claim 13, said second wheel supporting assembly including a single arcuate support arm and a second common axle bar disposed along the second common axis, said single arcuate support arm presenting opposite end margins, with one of the end margins pivotally intersecting the second common axle bar.

15. The agricultural header assembly as claimed in claim 14, said second wheel supporting assembly further including a second stabilizer bar, with the second stabilizer bar extending from a portion of the single arcuate support arm spaced from the pivotal intersection with the second common axle bar to the rigid beam to connect thereto at a location inboard of the second common connection location.

16. The agricultural header assembly as claimed in claim 12, each of said first and second wheel supporting assemblies being interconnected with the respective first and second wheels and with the rigid beam with a plurality of pin connections, such that the transition between the transport and field positions is substantially tool-less.

17. The agricultural header assembly as claimed in claim 14, said transport assembly further including an elongated tongue element configured to be pulled by a vehicle in a transport direction generally transverse to the normal operational direction of the agricultural header, said elongated tongue element presenting opposite end margins, with one of the end margins being connected to the second wheel supporting assembly at a tongue connection location generally centrally disposed along the second common axle bar.

18. The agricultural header assembly as claimed in claim 1, said crop-cutting assembly being substantially flexible, such that the crop-cutting assembly floats relative to the rigid beam.

19. The agricultural header assembly as claimed in claim 18,
said crop-conveying assembly being substantially flexible, such that the crop-conveying assembly floats relative to the rigid beam.

20. The agricultural header assembly as claimed in claim 1, said rigid beam being disposed along a lower margin of the header frame.

21. The agricultural header assembly as claimed in claim 20,
said header frame presenting opposite side margins, with the rigid beam extending continuously therebetween.

22. A header transport assembly operable to provide mobile support to an agricultural header when the header is in a transport orientation, where the header includes a header frame with a rigid beam extending laterally thereacross, with the header being in the transport orientation when the rigid beam is out of vertical alignment with the header center of gravity, said header transport assembly comprising:
a first pair of spaced apart wheels shiftably connectable to the rigid beam for movement between a transport position and a field position, with the first pair of wheels defining a first midpoint therebetween when in the transport position; and
a second pair of spaced apart wheels shiftably connectable to the rigid beam for movement between the transport and field positions, with the second pair of wheels defining a second midpoint therebetween when in the transport position,
said first and second midpoints each being configured to be disposed in general vertical alignment with the header center of gravity when the header is in the transport orientation to substantially balance the header on the transport assembly when connected thereto, with one of the first wheels being closer to the rigid beam than the other of the first wheels and one of the second wheels being closer to the rigid beam that the other of the second wheels.

23. The header transport assembly as claimed in claim 22,
said first pair of spaced apart wheels being disposed for rotation along a first common axis,
said second pair of spaced apart wheels being disposed for rotation along a second common axis,
said first and second common axes being generally orthogonal to the rigid beam and spaced laterally from one another.

24. The header transport assembly as claimed in claim 23; and
a first wheel supporting assembly carrying the first pair of spaced apart wheels for rotation thereon when in the transport position,
said first wheel supporting assembly including a pair of support arms and a first common axle bar disposed along the first common axis,
each support arm presenting opposite end margins, with one of each of the end margins intersecting the first common axle bar.

25. The header transport assembly as claimed in claim 24; and
a second wheel supporting assembly carrying the second pair of spaced apart wheels for rotation thereon when in the transport position,
said second wheel supporting assembly including a single arcuate support arm and a second common axle bar disposed along the second common axis,
said single arcuate support arm presenting opposite end margins, with one of the end margins pivotally intersecting the second common axle bar.

26. The header transport assembly as claimed in claim 25,
said first wheel supporting assembly being configured to operably connect the first wheels to the rigid beam at a first common connection location,
said second wheel supporting assembly being configured to operably connect the second wheels to the rigid beam at a second common connection location,
said first and second common connection locations being spaced laterally from one another along the rigid beam.

27. The header transport assembly as claimed in claim 26,
said first wheel supporting assembly further including a pair of first stabilizer bars, with each of the stabilizer bars being configured to extend from a portion of one of the support arms adjacent a respective one of the first wheels to the rigid beam for connection thereto at a location inboard of the first common connection location,
said second wheel supporting assembly further including a second stabilizer bar, with the second stabilizer bar being configured to extend from a portion of the single arcuate support arm spaced from the pivotal intersection with the second common axle bar to the rigid beam for connection thereto at a location inboard of the second common connection location.

* * * * *